(12) United States Patent
Ogashiwa et al.

(10) Patent No.: US 8,045,195 B2
(45) Date of Patent: Oct. 25, 2011

(54) IMAGE FORMING APPARATUS AND IMAGE FORMING SYSTEM

(75) Inventors: Akiyoshi Ogashiwa, Tokyo (JP); Makoto Ogawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 857 days.

(21) Appl. No.: 12/048,243

(22) Filed: Mar. 14, 2008

(65) Prior Publication Data

US 2008/0225324 A1    Sep. 18, 2008

(30) Foreign Application Priority Data

Mar. 16, 2007  (JP) ................................ 2007-069522
Mar. 7, 2008   (JP) ................................ 2008-058348

(51) Int. Cl.
  *G06K 15/00* (2006.01)
  *H04N 1/40* (2006.01)
(52) U.S. Cl. ...................................... 358/1.14; 358/3.28
(58) Field of Classification Search ................. 358/1.15, 358/1.9, 2.1, 444, 404, 400, 500, 501, 3.28, 358/448, 443, 1.14
See application file for complete search history.

(56) References Cited

U.S. PATENT DOCUMENTS

| 7,657,753 B2* | 2/2010 | Sawada | ........................ 713/183 |
| 7,679,767 B2* | 3/2010 | Kitada | ........................ 358/1.15 |
| 2005/0183141 A1* | 8/2005 | Sawada | ........................... 726/16 |
| 2005/0264846 A1 | 12/2005 | Tsuzuki | |
| 2007/0071416 A1* | 3/2007 | Ikemizu | ........................ 386/117 |
| 2008/0068642 A1* | 3/2008 | Takahashi | .................... 358/1.15 |
| 2008/0151313 A1* | 6/2008 | Ishimaru | ........................ 358/400 |
| 2008/0216155 A1* | 9/2008 | Nakabayashi | ..................... 726/3 |

FOREIGN PATENT DOCUMENTS

| JP | 2003-308196 A | 10/2003 |
| JP | 2004-328629 A | 11/2004 |
| JP | 2005-138418 A | 6/2005 |
| JP | 2005-335282 A | 12/2005 |
| JP | 2006-018398 A | 1/2006 |
| JP | 2006-211157 A | 8/2006 |

* cited by examiner

*Primary Examiner* — Jerome Grant, II
(74) *Attorney, Agent, or Firm* — Panitch Schwarze Belisario & Nadel LLP

(57) ABSTRACT

An image forming system is supplied which is able to prevent the record medium from being taken by other people and to improve the secrecy performance of image data. In the system, an image processing apparatus has an storing section that stores image data to form image, a reading section that reads out the identification information from a carriable medium, an encryption executing section that executes an encryption of the image data based on the identification information, and a transmitting section that transmits the encrypted image data to an image forming apparatus together with the identification information; and the image forming apparatus has a receiving section that receives the image data and the identification information, a reading section that reads out the identification information from the carriable medium, a judging section that judges the received image data based on the identification information, a decryption executing section that executes a decryption of the image data based on the identification information, and an image forming section that performs an image formation of the decrypted image data.

22 Claims, 13 Drawing Sheets

IMAGE FORMING APPARATUS AND IMAGE FORMING SYSTEM

BACKGROUND OF THE INVENTION

1. Field of the Invention

The invention relates to an image forming apparatus and an image forming system that performs an image formation on the basis of image data outputted from an image processing apparatus and ejects record medium finished with image formation, in particular, relates to an image forming apparatus and an image forming system that not only can improve secrecy performance of image data, but also can prevent the record medium finished with image formation from being taken by other people.

2. Related Background Art

As a printing system (i.e. image forming system), a system comprising at least one user terminal (i.e. image processing apparatus) and a printing apparatus (i.e. image forming apparatus) connecting with the at least one user terminal via communication line is used.

In the printing system, after print data (i.e. image data) to be printed is transmitted to the printing apparatus from the user terminal, the print data is printed (i.e. is performed an image formation) onto print paper by the printing apparatus, then, the print paper on which the print data has been printed is ejected from the printing apparatus as record medium finished with image formation.

Beforetime, in order to prevent the record medium finished with image formation from being taken by other people, for example, as stated in a patent document 1 mentioned below, a non-contact type IC card carried by user is designed, after the user is identified by the printing apparatus through using the non-contact type IC card, whereafter, in the case that the user is in the place, a print of corresponding print data is performed as an identification print.

Whereas, in such printing system, because that the print data is transmitted from the user terminal to the printing apparatus via the communication line, there is a possibility that the print data is purloined by a purloining action of communication interception through using computer connected with the communication line. In order to inhibit such purloining action, a method is adopted to transmit the print data to the printing apparatus after encrypted the print data in the user terminal.

Patent document 1: Japan patent publication 2005-335282.

However, in such encrypting method, because a settled and identical encrypting key is always set in each user terminal, the respective print data all are encrypted by the identical encrypting key. Thereby, the purloining people can easily decipher the encrypting method from respective purloined data and obtain the print data. Therefore, in the case that the print data is data with high secrecy performance, the user (i.e. client) will sustain great damage.

SUMMARY OF THE INVENTION

It is, therefore, an object of the invention to provide an image forming apparatus and an image forming system capable of solving the above problem. That is, the present invention supplies an image forming apparatus and an image forming system which not only can prevent the record medium finished with image formation from being taken by other people, but also can make the decipherment of the encrypted print data become difficult so as to improve the secrecy performance.

According to the present invention, there is provided an image forming system, comprising at least one image processing apparatus; an image forming apparatus that is connected with the image processing apparatus via communication line; and at least one carriable medium used for identifying user using the image processing apparatus, wherein the carriable medium has a record medium finished with printing storing section to store identification information to identify the user using the image processing apparatus;

wherein the image processing apparatus has an image data storing section that stores image data to form image, a processing apparatus side reading section that reads out the identification information from the carriable medium, an encryption executing section that executes an encryption with respect to the image data on the basis of the identification information, and a transmitting section that transmits the encrypted image data to the image forming apparatus together with the identification information; and wherein the image forming apparatus has a receiving section that receives the image data and the identification information from the image processing apparatus, a forming apparatus side reading section that reads out the identification information from the carriable medium, a judging section that judges the received image data on the basis of the identification information read out, a decryption executing section that executes a decryption with respect to the judged image data on the basis of the identification information, and an image forming section that performs an image formation of the decrypted image data onto record medium.

Further, according to the present invention, there is also provided an image forming system, comprising at least one image processing apparatus; an image forming apparatus that is connected with the image processing apparatus via communication line; and at least one carriable medium used for identifying user using the image processing apparatus, wherein the carriable medium previously store identification information to identify corresponding user using the image processing apparatus;

wherein the image processing apparatus has an image data storing section that stores image data to form image, a processing apparatus side reading section that reads out the identification information from the carriable medium, an encryption executing section that executes an encryption with respect to the image data on the basis of the identification information, a processing apparatus side result obtaining section that performs a predetermined calculation with respect to the identification information and obtains a calculation result corresponding to the identification information, and a transmitting section that assigns the calculation result to the encrypted image data and transmits the encrypted image data and the calculation result to the image forming apparatus; and wherein the image forming apparatus has a receiving section that receives the image data and the calculation result from the image processing apparatus, a forming apparatus side reading section that reads out the identification information from the carriable medium, a forming apparatus side result obtaining section that performs the predetermined calculation with respect to the identification information read out and obtains a calculation result corresponding to the identification information, a judging section that judges the received image data on the basis of the obtained calculation result, a decryption executing section that executes a decryption with respect to the judged image data on the basis of the identification information, and an image forming section that performs an image formation of the decrypted image data onto record medium.

Furthermore, according to the present invention, there is also provided an image forming system, comprising at least one image processing apparatus; an image forming apparatus that is connected with the image processing apparatus via communication line; and at least one carriable medium used for identifying user using the image processing apparatus, wherein the carriable medium previously store identification information to identify corresponding user using the image processing apparatus;

wherein the image processing apparatus has an image data storing section that stores image data to form image, a random number generating section that generates random number, a processing apparatus side reading section that reads out the identification information from the carriable medium, a writing section that writes the random number generated by the random number generating section into the carriable medium, an encryption executing section that executes an encryption with respect to the image data at least on the basis of the random number in the identification information and the random number, and a transmitting section that transmits the encrypted image data and the identification information to the image forming apparatus; and wherein the image forming apparatus has a receiving section that receives the image data and the identification information from the image processing apparatus, a forming apparatus side reading section that reads out the identification information and the random number from the carriable medium, a judging section that judges the received image data on the basis of the identification information read out, a decryption executing section that executes a decryption with respect to the judged image data at least on the basis of the random number in the identification information and the random number that are read out, and an image forming section that performs an image formation of the decrypted image data onto record medium.

Further, according to the present invention, there is provided an image forming apparatus having communication line capable of connecting with at least one image processing apparatus, comprising a reading section that reads out identification information from at least one carriable medium; a receiving section that receives the image data related to the identification information from the image processing apparatus, a judging section that judges the received image data on the basis of the identification information read out, a decryption executing section that executes a decryption with respect to the judged image data on the basis of the identification information, and an image forming section that performs an image formation on the basis of the decrypted image data.

EFFECT OF THE PRESENT INVENTION

According to the present invention, because the image forming apparatus performs an image formation after executed an identification of user with respect to a carriable medium carried by user, it is possible to prevent the record medium finished with image formation from being taken by other people.

Further, because image data is encrypted on the basis of identification information of each user before the image data is transmitted from the image processing apparatus to the image forming apparatus, according to dissimilarity of the identification information, the respective encrypting methods become different from each other.

Therefore, even if purloining action of image data due to communication interception happened, it is possible to make the decipherment of the purloined data become difficult so as to improve the secrecy performance of image data.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

The following is to explain a printing system of the present invention in detail by embodiments using drawings.

Moreover, in the respective embodiments stated below, as common operation, after image data such as print data or the like is transmitted from an image processing apparatus such as user terminal or the like to image forming apparatus such as printing apparatus or the like connected with the image processing apparatus, in the image forming apparatus, an identification of user using a carriable identification medium such as identification card or the like is performed, then, an image formation such as print or the like is performed by an image forming section such as printing section or the like.

Embodiment 1

Figure 1:
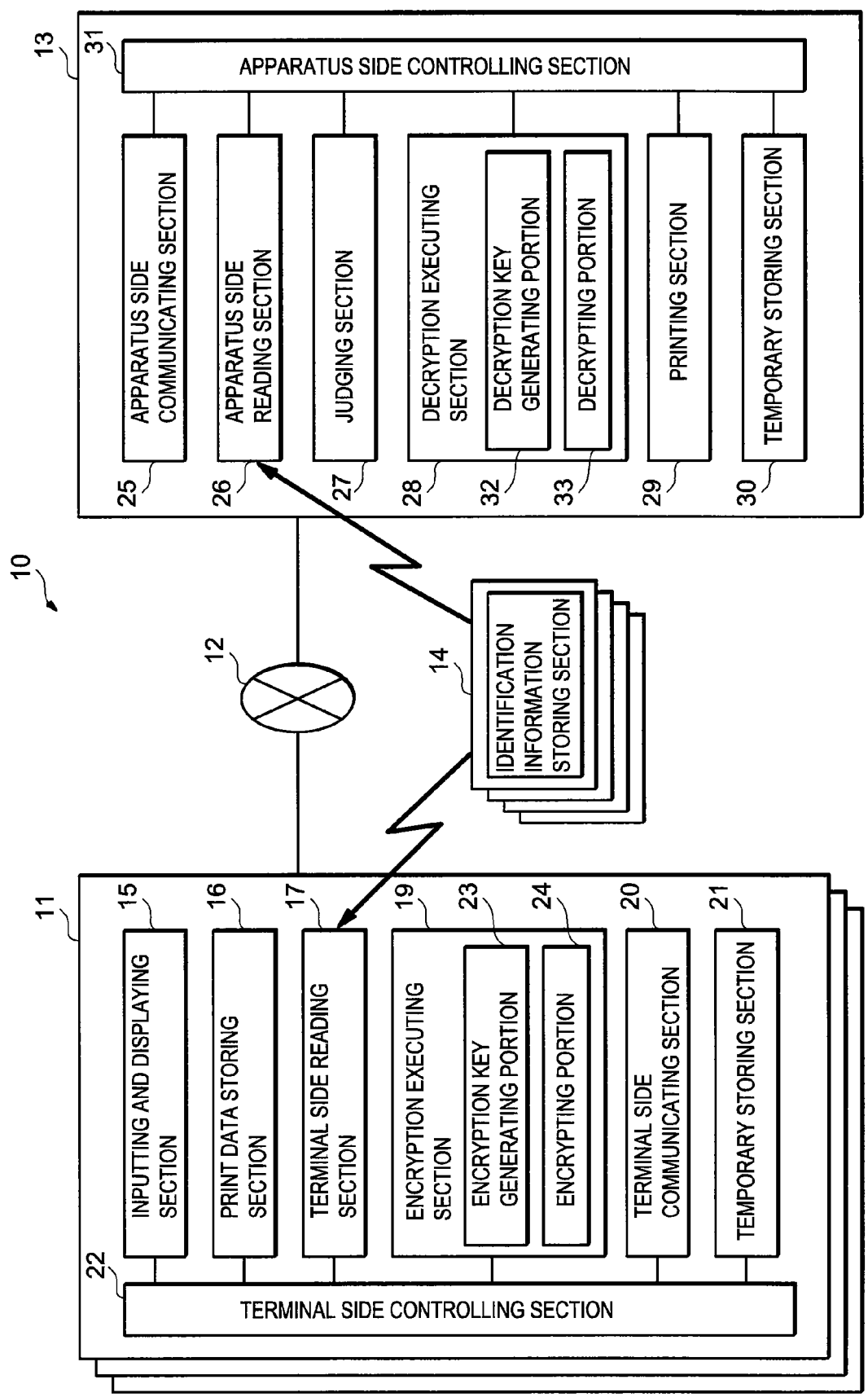
FIG. 1 is a block diagram showing a structure of a printing system of the present invention in embodiment 1.

Structure of Embodiment 1:

FIG. 1 is a block diagram showing a structure of a printing system of the present invention in embodiment 1.

As shown by FIG. 1, a printing system 10 of the present invention comprises a plurality of user terminals 11, a printing apparatus 13 connecting with the plurality of user terminals 11 via communication line 12, and a plurality of identification cards 14 that can be read and communicated by the respective user terminals 11 and the printing apparatus 13.

The printing system 10 is used as a kind of image forming system; the user terminal 11 is used as a kind of image processing apparatus; and the printing apparatus 13 is used as a kind of image forming apparatus.

Further, as the communication line 12, it is possible to adopt internet or network or the like.

Moreover, the identification card 14 is carried by a corresponding user as a carriable medium.

Furthermore, the user terminal 11 may be used by plural users, also may be exclusively used by one user.

The identification card 14 corresponds to a user and has an identification information storing section to store identification information for identifying the user.

The user terminal 11 includes an inputting and displaying section 15, a print data storing section 16, a terminal side reading section 17, an encryption executing section 19, a terminal side communicating section 20, a temporary storing section 21 and a terminal side controlling section 22 for controlling the respective sections.

The inputting and displaying section 15 has a function to display scene so as to make user perform input operation. Through a manipulation of user to use the inputting and displaying section 15, it is possible to generate print data to be printed mentioned below, and to select print command for printing print data.

The print data storing section 16 has a function to store generated print data

The terminal side reading section 17 has a function to read out identification information from the identification card 14. On the terminal side reading section 17, an insertion opening is furnished for inserting the identification card 14.

In the embodiment, as the identification information, it is to adopt identification number of numerical type.

Moreover, as the identification information, it may be to adopt identification name of character type. In the case, the user terminal 11 may further include a data type changing section to change the identification name into that of numerical type.

For example, the data type changing section performs a corresponding change between character type and numerical type by using ASCII (American National Standard Code for Information Interchange) code interchanging list.

The encryption executing section 19 has an encryption key generating portion 23 for generating an encryption key on the basis of the read identification information, and an encrypting portion 24 for encrypting print data on the basis of the generated encryption key.

The terminal side communicating section 20 has a function to perform transmission and receiving with the printing apparatus 13 via the communication line 12 such as LAN (Local Area Network) or the like. Therefore, the terminal side communicating section 20, as a transmitting section, has a function to transmit the encrypted print data to the printing apparatus 13 together with the identification information. In the terminal side communicating section 20, for example, a number of (192.168.0.1) is allotted as a terminal use IP address (Internet Protocol Address) for identifying terminal.

The temporary storing section 21 has a function to temporarily store input data of user, or identification information that is read, or the like.

The terminal side controlling section 22 performs whole control operation for making the above stated respective functions in the user terminal 11 realize, so has a control program (not shown).

Further, the printing apparatus 13 includes an apparatus side communicating section 25, an apparatus side reading section 26, a judging section 27, a decryption executing section 28, a printing section 29, a temporary storing section 30 and an apparatus side controlling section 31 to control these sections.

The apparatus side communicating section 25 has a function to a function to perform transmission and receiving with the user terminal 11 via the communication line 12. Therefore, the apparatus side communicating section 25, as a receiving section, has a function to receive identification information and print data from the user terminal 11. In the apparatus side communicating section 25, for example, a number of (192.168.0.2) is allotted as a printing apparatus use IP address (Internet Protocol Address) for identifying printing apparatus.

The apparatus side reading section 26 has a function to read out identification information from the identification card 14. On the apparatus side reading section 26, an insertion opening is furnished for inserting the identification card 14.

The judging section 27 has a function to judge the received print data on the basis of the read identification information.

The decryption executing section 28 has a decryption key generating portion 32 to generate decryption key on the basis of identification information, and a decrypting portion 33 to decrypt print data on the basis of the generated decryption key.

The printing section 29 has a function to print decrypted print data onto record medium.

The temporary storing section 30 has a function to temporarily store received identification information or received print data or the like.

The apparatus side controlling section 31 performs whole control operation for making the above stated respective functions in the printing apparatus 13 realize, so has a control program (not shown).

Operations of Embodiment 1:

First is to explain a decision of a key generation threshold value between the user terminal 11 and the printing apparatus 13.

On the side of the user terminal 11, when a power source is turned on; or when a print request happens; or when a modification request of a key generation threshold value used by the user terminal 11 and the printing apparatus 13 happens at each predetermined time or through a manipulation of user, the terminal side controlling section 22 produces random number, and stores a key generation threshold value (e.g. 3 hex) decided by the produced random number, and the printing apparatus use IP address of (192.168.0.2) into a key generation threshold value storing section in the user terminal 11 through making a relation of the key generation threshold value and the printing apparatus use IP address.

Then, the terminal side communicating section 20 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

The apparatus side controlling section 31 in the printing apparatus 13, when received the key modification instructing command assigned the printing apparatus use IP address of (192.168.0.2), stores the key generation threshold value (3 hex) and the terminal use IP address of (192.168.0.1) assigned to the key generation threshold value into a key generation threshold value storing section in the printing apparatus 13 through making a relation of the key generation threshold value and the terminal use IP address. Then, in the case that data waiting for an identification print is existing, till the data waiting for an identification print does not exist, an old key generation threshold value is kept. When the data waiting for an identification print becomes inexistent, the old key generation threshold value is deleted.

The apparatus side controlling section 31, after stored the key generation threshold value into the key generation threshold value storing section in the printing apparatus 13, transmits key generation threshold value store end information that is assigned the terminal use IP address of (192.168.0.1) and the printing apparatus use IP address of (192.168.0.2) from the apparatus side communicating section 25 via the communication line 12.

After the terminal side communicating section 20 received the key generation threshold value store end information assigned the terminal use IP address of (192.168.0.1) of the terminal side communicating section 20, the terminal side controlling section 22 performs a display representing an end of modification request of key generation threshold value, and finishes the process.

Further, in the case that the terminal side communicating section 20 does not receive the key generation threshold value store end information assigned the printing apparatus use IP address of the apparatus side communicating section 25 and the terminal use IP address of the terminal side communicating section 20 within a predetermined time, the terminal side controlling section 22 deletes the key generation threshold value (3 hex) related to the printing apparatus use IP address of the apparatus side communicating section 25 from the key generation threshold value storing section in the user terminal 11 due to use incapableness, and makes the inputting and displaying section 15 display an alarm.

Further, on the side of the printing apparatus 13, when a power source is turned on; or when a modification request of a key generation threshold value used by the user terminal 11 and the printing apparatus 13 happens at each predetermined time or through a manipulation of user, the apparatus side controlling section 31 in the printing apparatus 13 produces random number and stores a key generation threshold value (e.g. 3 hex) decided by the produced random number, and the terminal use IP address of (192.168.0.1) into a key generation threshold value storing section in the printing apparatus 13 through making a relation of the key generation threshold value and the terminal use IP address.

Further, in the case that data waiting for an identification print is existing, till the data waiting for an identification print does not exist, the apparatus side controlling section 31 keeps an old key generation threshold value. When the data waiting for an identification print becomes inexistent, the apparatus side controlling section 31 deletes the old key generation threshold value.

Then, the apparatus side communicating section 25 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

When the terminal side communicating section 20 received the key modification instructing command assigned the terminal use IP address of (192.168.0.1) of the terminal side communicating section 20, the terminal side controlling section 22 of the user terminal 11 stores the key generation threshold value (3 hex) and the printing apparatus use IP address of (192.168.0.2) assigned to the key generation threshold value into a key generation threshold value storing section in the user terminal 11 through making a relation of the key generation threshold value and the printing apparatus use IP address.

The terminal side controlling section 22, after stored the key generation threshold value into the key generation threshold value storing section in the user terminal 11, transmits key generation threshold value store end information that is assigned the terminal use IP address of (192.168.0.1) and the printing apparatus use IP address of (192.168.0.2) from the terminal side communicating section 20 via the communication line 12.

After the apparatus side communicating section 25 received the key generation threshold value store end information assigned the printing apparatus use IP address (192.168.0.2) of the apparatus side communicating section 25, the apparatus side controlling section 31 outputs a print representing an end of modification request of key generation threshold value, and finishes the process.

Further, in the case that the apparatus side communicating section 25 does not receive the key generation threshold value store end information assigned the printing apparatus use IP address of the apparatus side communicating section 25 and the terminal use IP address of the terminal side communicating section 20 within a predetermined time, the apparatus side controlling section 31 deletes the key generation threshold value (3 hex) related to the printing apparatus use IP address of (192.168.0.2) of the terminal side communicating section 20 from the key generation threshold value storing section in the printing apparatus 13 due to use incapableness, and makes the printing section 29 output an alarm.

Next, it is to explain operation of the printing system 10 of the present invention according to a flowchart.

Figure 2:
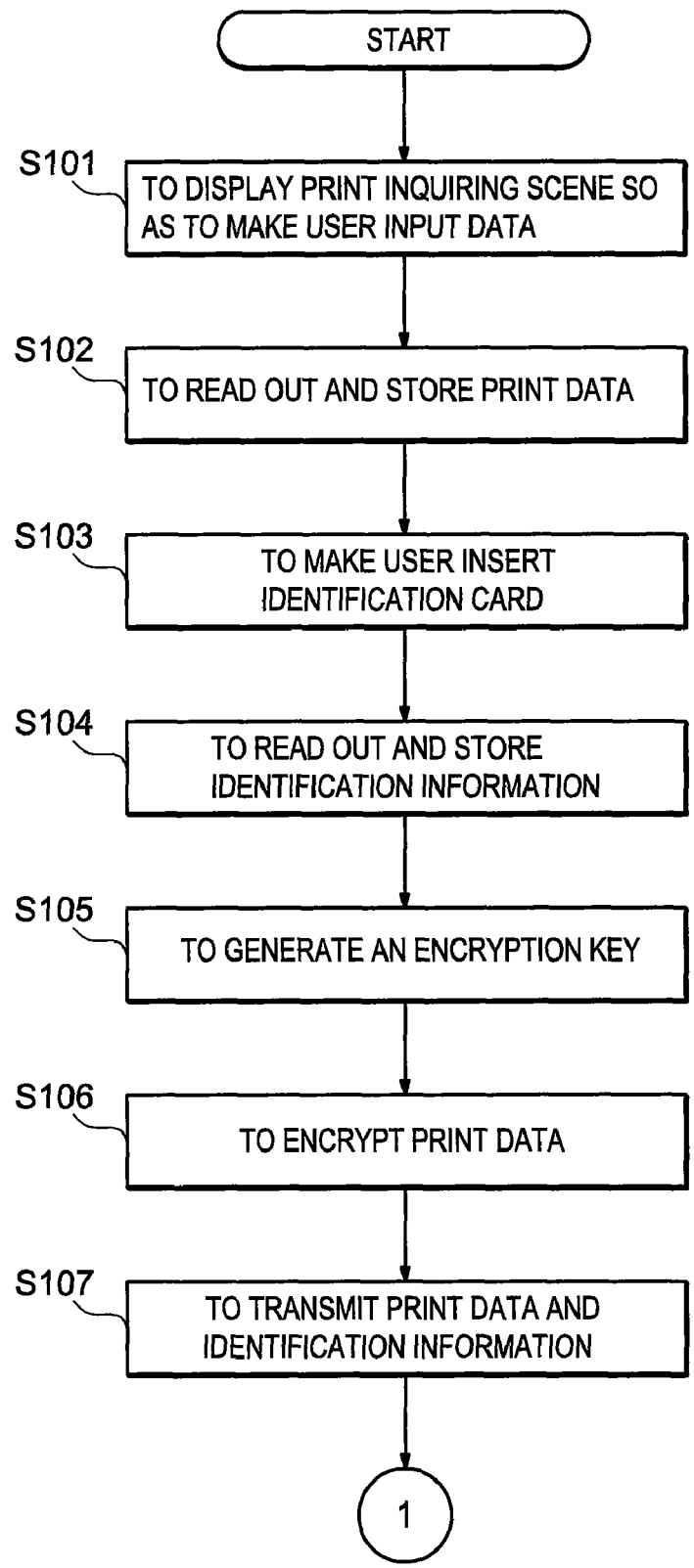
FIG. 2 is a first flowchart showing operations of a printing system of the present invention in embodiment 1.

FIG. 2 is a first flowchart showing operations of a printing system of the present invention in embodiment 1; that is, the FIG. 2 shows operation of the user terminal 11.

Figure 3:
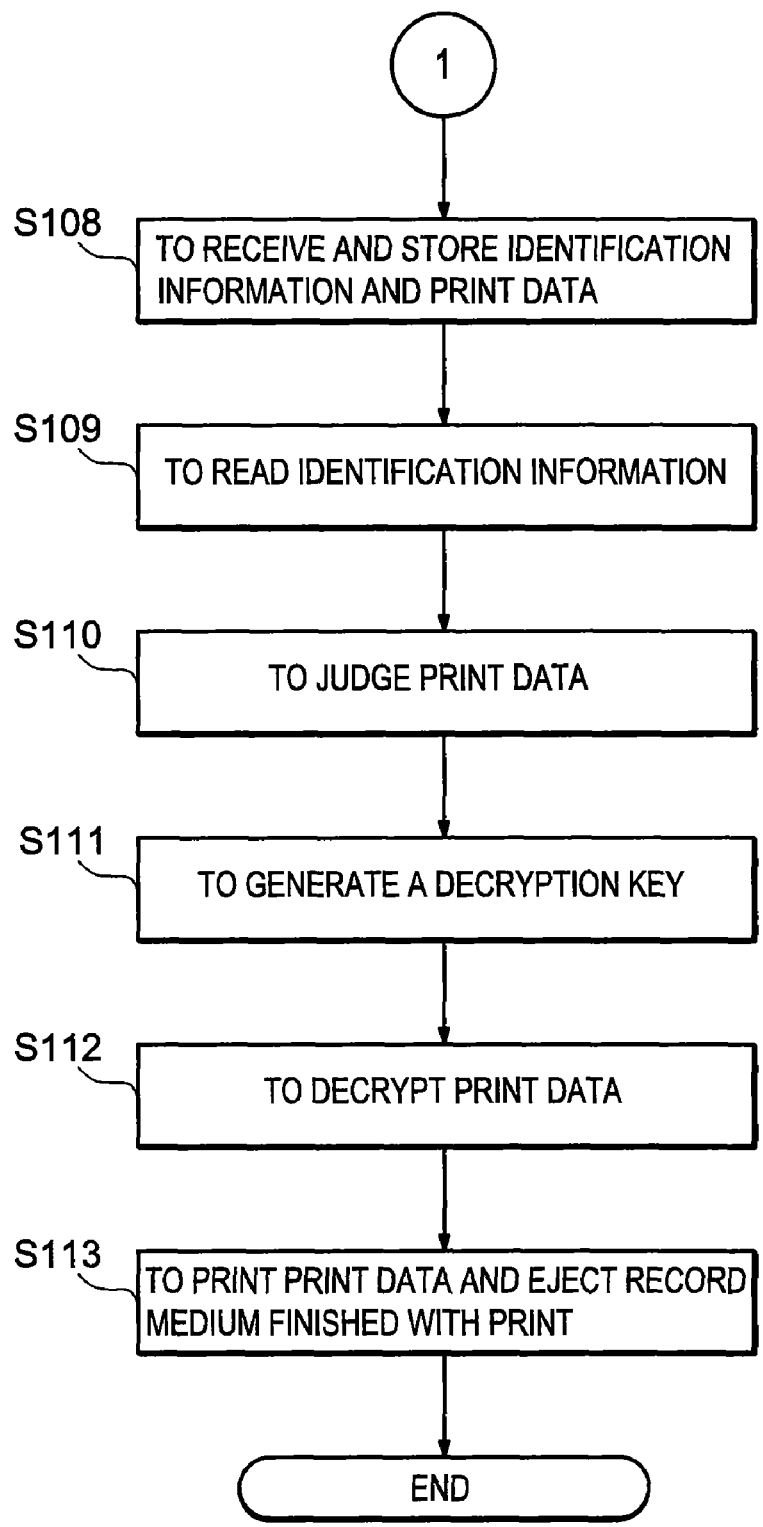
FIG. 3 is a second flowchart showing operations of a printing system of the present invention in embodiment 1.

FIG. 3 is a second flowchart showing operations of a printing system of the present invention in embodiment 1, that is, the FIG. 3 shows operation of the printing apparatus 13.

In the user terminal 11, the terminal side controlling section 22 performs control operation to control the whole user terminal 11, then controls the inputting and displaying section 15 to display a print inquiring scene for inquiring whether to perform a print or not (Step S101). The inputting and displaying section 15 displays the scene so as to make user input (Step S101).

After user selected print command, the terminal side controlling section 22 reads out print data from the print data storing section 16 and makes the temporary storing section 21 temporarily store the print data (Step S102).

For example, data of [PRINT "Hello world"] is read out and is stored in the temporary storing section 21 as print data.

Further, the terminal side controlling section 22 controls the inputting and displaying section 15 to display an identification card insertion guidance scene so as to make user insert the identification card 14 into the insertion opening of the terminal side reading section 17 (Step S103).

The terminal side reading section 17, when detected that the identification card 14 is located in a readable predetermined place through sensor (not shown), reads out the identification information from the identification information storing section of the identification card 14 (Step S104). The identification information is stored in the temporary storing section 21 through the terminal side controlling section 22 to correspond to the print data (Step S104).

For example, as the identification information of the identification card 14, data of [ID "12 hex"] (hex means that it is hexadecimal) is read out.

Continuously, the encryption key generating portion 23 in the encryption executing section 19 generates an encryption key for encrypting print data on the basis of the identification information (Step S105), the encrypting portion 24 encrypts the print data stored in the temporary storing section 21 on the basis of the generated encryption key (Step S106).

For example, the encryption key generating portion 23 reads out a key generation threshold value (3 hex) which is related to the identification information of [ID "12 hex"] read out from the identification card 14 and the printing apparatus use IP address of (192.168.0.2) of the apparatus side communicating section 25 in the printing apparatus 13 to instruct print; and adds the key generation threshold value (3 hex) into the identification information (12 hex); then obtains an encryption key (15 hex).

Further, the encrypting portion 24 performs an ASCII code change with respect to the print data to change the character string of [PRINT "Hello world"] into ["50, 52, 49, 4E, 54, 22, 48, 65, 6C, 6C, 6F, 77, 20, 77, 6F, 72, 6C, 64, 22" hex].

Moreover, a check sum of MD5 (Message Digest Algorithm 5) or the like is obtained from print data.

Continuously, in order to confirm whether encryption data is normally decrypted or not with respect to print data of ["65, 67, 5E, 63, 69, 37, 5D, 7A, 81, 81, 84, 8C 35, 8C, 84, 87, 81, 79, 37" hex] having added the encryption key (15 hex) per byte of print data performed ASCII code change, the encrypted print data assigned the check sum obtained from the print data is transmitted.

Then, the terminal side communicating section 20 transmits the encrypted print data and the identification information to the printing apparatus 13 (Step S107).

For example, the printing apparatus use IP address of (192.168.0.2), the terminal use IP address of (192.168.0.1) and the identification information (12 hex) are assigned to the encrypted print data and are transmitted together with the encrypted print data.

Next, in the printing apparatus 13, the apparatus side controlling section 31 controls the apparatus side communicating section 25 to receive the identification information and the encrypted print data from the user terminal 11; and controls the temporary storing section 30 to store the identification information and the encrypted print data (Step S108).

For example, when the apparatus side communicating section 25 received the encrypted print data assigned the printing apparatus use IP address of (192.168.0.2) of the apparatus side communicating section 25, the apparatus side controlling section 31 makes a relation among the encrypted print data, the terminal use IP address of (192.168.0.1) assigned to the encrypted print data and the identification information (12 hex) and controls the temporary storing section 30 to store them.

Then, when user goes to the printing apparatus 13 and uses his/her own identification card 14 to insert the identification card 14 into the insertion opening of the apparatus side reading section 26, the apparatus side reading section 26 reads out the identification information from the identification card 14 after detected that the identification card 14 is located in a readable predetermined place through sensor (not shown) (Step S109).

After the identification information is read out, the judging section 27 searches the temporary storing section 30, and judges identification information which corresponds to the identification information read out from the identification card 14, then judges print data corresponding to the judged identification information (Step S110).

After the print data is judged, the decryption key generating portion 32 of the decryption executing section 28 generates a decryption key for decrypting the print data on the basis of the identification information (Step S111), the decrypting portion 33 decrypts the print data on the basis of the generated decryption key (Step S112).

For example, after the encrypted print data assigned the identification information (12 hex) is judged, the decryption key generating portion 32 reads out the key generation threshold value (3 hex) corresponding to the terminal use IP address of (192.168.0.1) related to the encrypted print data.

Then, a decryption key (15 hex) is generated by adding the key generation threshold value (3 hex) to the identification information (12 hex).

The decrypting portion 33 extracts data of ["65, 67, 5E, 63, 69, 37, 5D, 7A, 81, 81, 84, 8C 35, 8C, 84, 87, 81, 79, 37" hex] except a check sum from the encrypted print data, and performs a subtraction to subtract the decryption key (15 hex) from each byte, then obtains data of ["50, 52, 49, 4E, 54, 22, 48, 65, 6C, 6C, 6F, 77, 20, 77, 6F, 72, 6C, 64, 22" hex] having be released encryption.

Moreover, through performing a character code change of ASCII code, print data of [PRINT "Hello world"] is obtained.

Furthermore, a check sum of MD5 or the like is obtained from print data having be released encryption, then the check sum is compared with the check sum assigned to the encrypted print data, if the two check sums are in conformity, it means that the print data is correctly decrypted, then a printing process is executed; if two check sums are different, an error without data conformity is displayed.

After the print data is decrypted, the printing section 29 prints the print data onto record medium such as print paper and ejects the printed paper as record medium finished with printing (Step S113). With the ejection of the record medium finished with printing, user can obtain the record medium finished with printing in the place.

Then, the apparatus side controlling section 31 finishes the process.

Effect of the Embodiment 1:

According to the embodiment 1 of the present invention, because the printing apparatus performs a printing process after executed an identification of user with respect to an identification card carried by user, it is possible to prevent the record medium finished with printing from being taken by other people.

Further, because print data is encrypted on the basis of identification information of each user before the print data is transmitted from the user terminal to the printing apparatus, according to dissimilarity of the identification information, the respective encrypting methods become different from each other. Therefore, even if purloining action of print data due to communication interception happened, it is possible to make the decipherment of the purloined data become difficult so as to improve the secrecy performance of print data.

Next, it is to explain embodiment 2.

Regarding the same component as that in the embodiment 1, the same symbol will be assigned, and the same explanation will be omitted.

Embodiment 2

Figure 4:
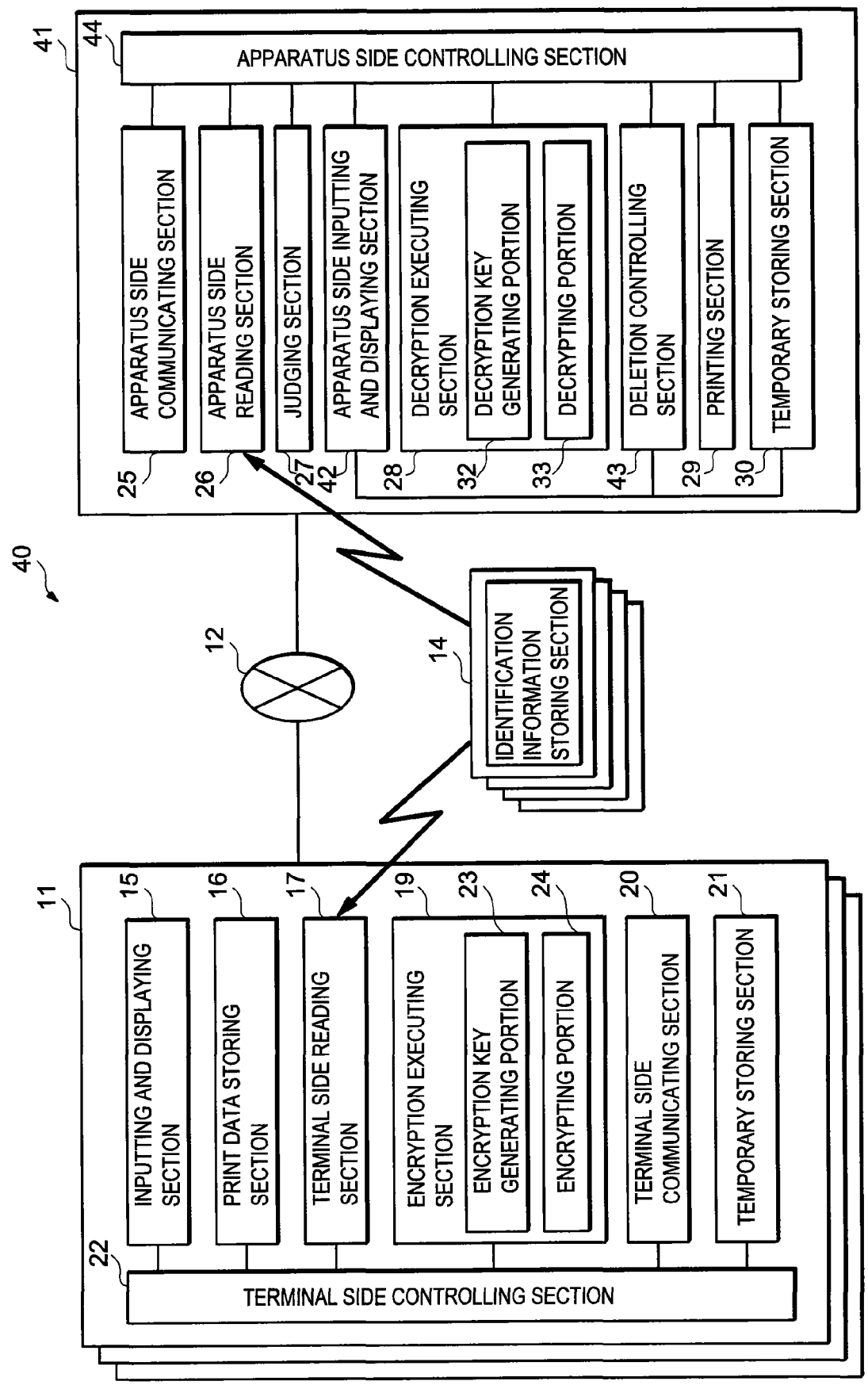
FIG. 4 is a block diagram showing a structure of a printing system of the present invention in embodiment 2.

Structure of Embodiment 2:

FIG. 4 is a block diagram showing a structure of a printing system of the present invention in embodiment 2.

As shown by FIG. 4, a printing system 40 of the present invention comprises a plurality of user terminals 11, a printing apparatus 41 connecting with the plurality of user terminals 11 via communication line 12, and a plurality of identification cards 14 that can be read and communicated by the respective user terminals 11 and the printing apparatus 41.

The printing system 40 is used as a kind of image forming system; and the printing apparatus 41 is used as a kind of image forming apparatus.

The printing apparatus 41 includes an apparatus side communicating section 25, an apparatus side reading section 26, a judging section 27, a decryption executing section 28, a printing section 29, a temporary storing section 30, an apparatus side inputting and displaying section 42, a deletion controlling section 43 and an apparatus side controlling section 44 to control these sections.

The apparatus side inputting and displaying section 42 has a function to display a deletion/print inquiring scene used for inquiring user whether to delete print data received from the user terminal 11 or not, so as to make user perform manipulation operation.

The deletion controlling section 43, as an apparatus side judging section, has a function to delete the print data without starting the decryption executing section 28 when a deletion signal representing a deletion is outputted from the apparatus side inputting and displaying section 42; and to start the decryption executing section 28 when a print signal representing a print is outputted from the apparatus side inputting and displaying section 42.

The apparatus side controlling section 44 performs whole control operation for making the above stated respective functions in the printing apparatus 41 realize, so has a control program (not shown).

Operations of Embodiment 2:

First is to explain a decision of a key generation threshold value between the user terminal 11 and the printing apparatus 41.

On the side of the user terminal 11, when a power source is turned on; or when a print request happens; or when a modification request of a key generation threshold value used by the user terminal 11 and the printing apparatus 41 happens at each predetermined time or through a manipulation of user, the terminal side controlling section 22 produces random number, and stores a key generation threshold value (e.g. 3 hex) decided by the produced random number, and the printing apparatus use IP address of (192.168.0.2) into a key generation threshold value storing section in the user terminal 11 through making a relation of the key generation threshold value and the printing apparatus use IP address.

Then, the terminal side communicating section 20 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

The apparatus side controlling section 44 in the printing apparatus 41, when received the key modification instructing command assigned the printing apparatus use IP address of (192.168.0.2), stores the key generation threshold value (3 hex) and the terminal use IP address of (192.168.0.1) assigned to the key generation threshold value into a key generation threshold value storing section in the printing apparatus 41 through making a relation of the key generation threshold value and the terminal use IP address. Then, in the case that data waiting for an identification print is existing, till the data waiting for an identification print does not exist, an old key generation threshold value is kept. When the data waiting for an identification print becomes inexistent, the old key generation threshold value is deleted.

The apparatus side controlling section 44, after stored the key generation threshold value into the key generation threshold value storing section in the printing apparatus 41, transmits key generation threshold value store end information that is assigned the terminal use IP address of (192.168.0.1) and the printing apparatus use IP address of (192.168.0.2) from the apparatus side communicating section 25 via the communication line 12.

After the terminal side communicating section 20 received the key generation threshold value store end information assigned the terminal use IP address of (192.168.0.1) of the terminal side communicating section 20, the terminal side controlling section 22 performs a display representing an end of modification request of key generation threshold value, and finishes the process.

Further, in the case that the terminal side communicating section 20 does not receive the key generation threshold value store end information assigned the printing apparatus use IP address of the apparatus side communicating section 25 and the terminal use IP address of the terminal side communicating section 20 within a predetermined time, the terminal side controlling section 22 deletes the key generation threshold value (3 hex) related to the printing apparatus use IP address of the apparatus side communicating section 25 from the key generation threshold value storing section in the user terminal 11 due to use incapableness, and makes the inputting and displaying section 15 display an alarm.

Further, on the side of the printing apparatus 41, when a power source is turned on; or when a modification request of a key generation threshold value used by the user terminal 11 and the printing apparatus 41 happens at each predetermined time or through a manipulation of user, the apparatus side controlling section 44 in the printing apparatus 41 produces random number and stores a key generation threshold value (e.g. 3 hex) decided by the produced random number, and the terminal use IP address of (192.168.0.1) into a key generation threshold value storing section in the printing apparatus 41 through making a relation of the key generation threshold value and the terminal use IP address.

Further, in the case that data waiting for an identification print is existing, till the data waiting for an identification print does not exist, the apparatus side controlling section 44 keeps an old key generation threshold value. When the data waiting for an identification print becomes inexistent, the apparatus side controlling section 44 deletes the old key generation threshold value.

Then, the apparatus side communicating section 25 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

When the terminal side communicating section 20 received the key modification instructing command assigned the terminal use IP address of (192.168.0.1) of the terminal side communicating section 20, the terminal side controlling section 22 of the user terminal 11 stores the key generation threshold value (3 hex) and the printing apparatus use IP address of (192.168.0.2) assigned to the key generation threshold value into a key generation threshold value storing section in the user terminal 11 through making a relation of the key generation threshold value and the printing apparatus use IP address.

The terminal side controlling section 22, after stored the key generation threshold value into the key generation threshold value storing section in the user terminal 11, transmits key generation threshold value store end information that is assigned the terminal use IP address of (192.168.0.1) and the printing apparatus use IP address of (192.168.0.2) from the terminal side communicating section 20 via the communication line 12.

After the apparatus side communicating section 25 received the key generation threshold value store end information assigned the printing apparatus use IP address (192.168.0.2) of the apparatus side communicating section 25, the apparatus side controlling section 44 outputs a print representing an end of modification request of key generation threshold value, and finishes the process.

Further, in the case that the apparatus side communicating section 25 does not receive the key generation threshold value store end information assigned the printing apparatus use IP address of the apparatus side communicating section 25 and the terminal use IP address of the terminal side communicating section 20 within a predetermined time, the apparatus side controlling section 44 deletes the key generation threshold value (3 hex) related to the printing apparatus use IP address of (192.168.0.2) of the terminal side communicating section 20 from the key generation threshold value storing section in the printing apparatus 41 due to use incapableness, and makes the printing section 29 output an alarm.

Next, it is to explain operation of the printing system 40 of the present invention according to a flowchart.

Figure 5:
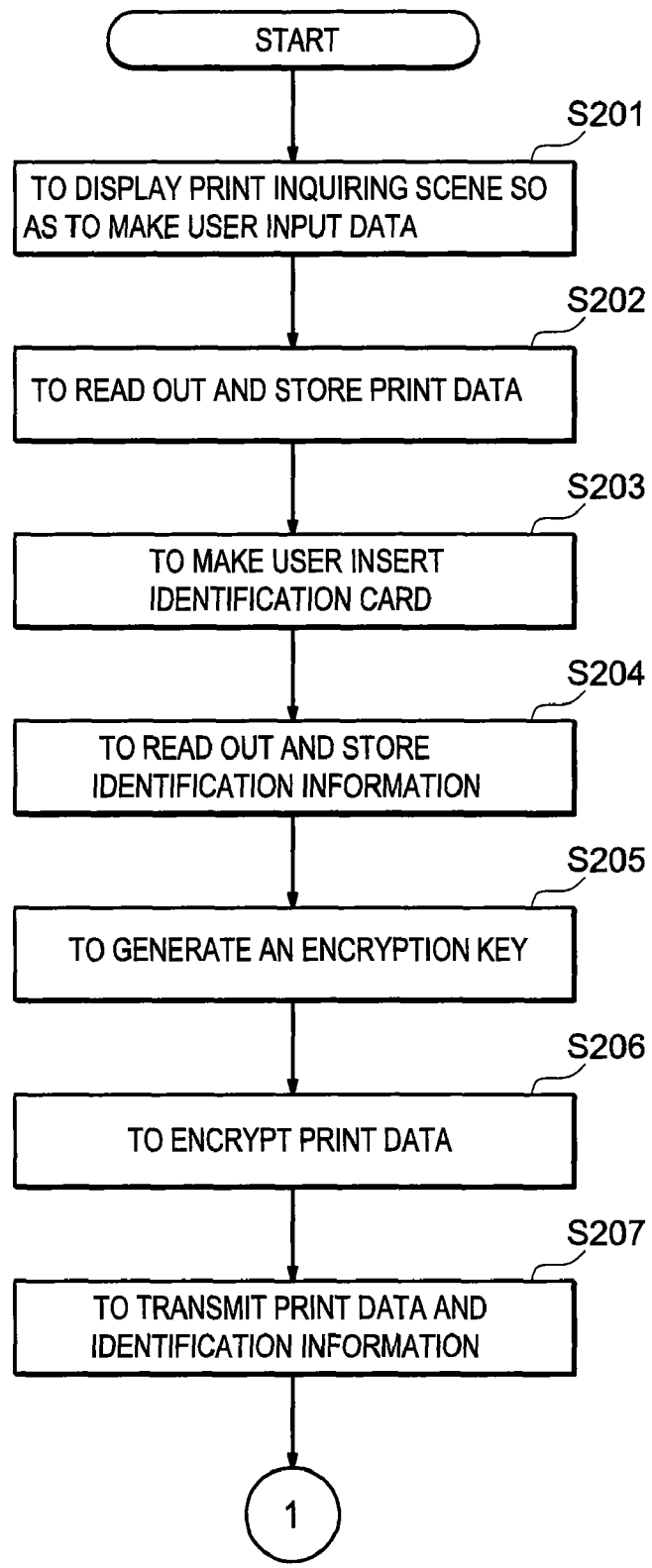
FIG. 5 is a first flowchart showing operations of a printing system of the present invention in embodiment 2.

FIG. 5 is a first flowchart showing operations of a printing system of the present invention in embodiment 1; that is, the FIG. 5 shows operation of the user terminal 11.

Figure 6:
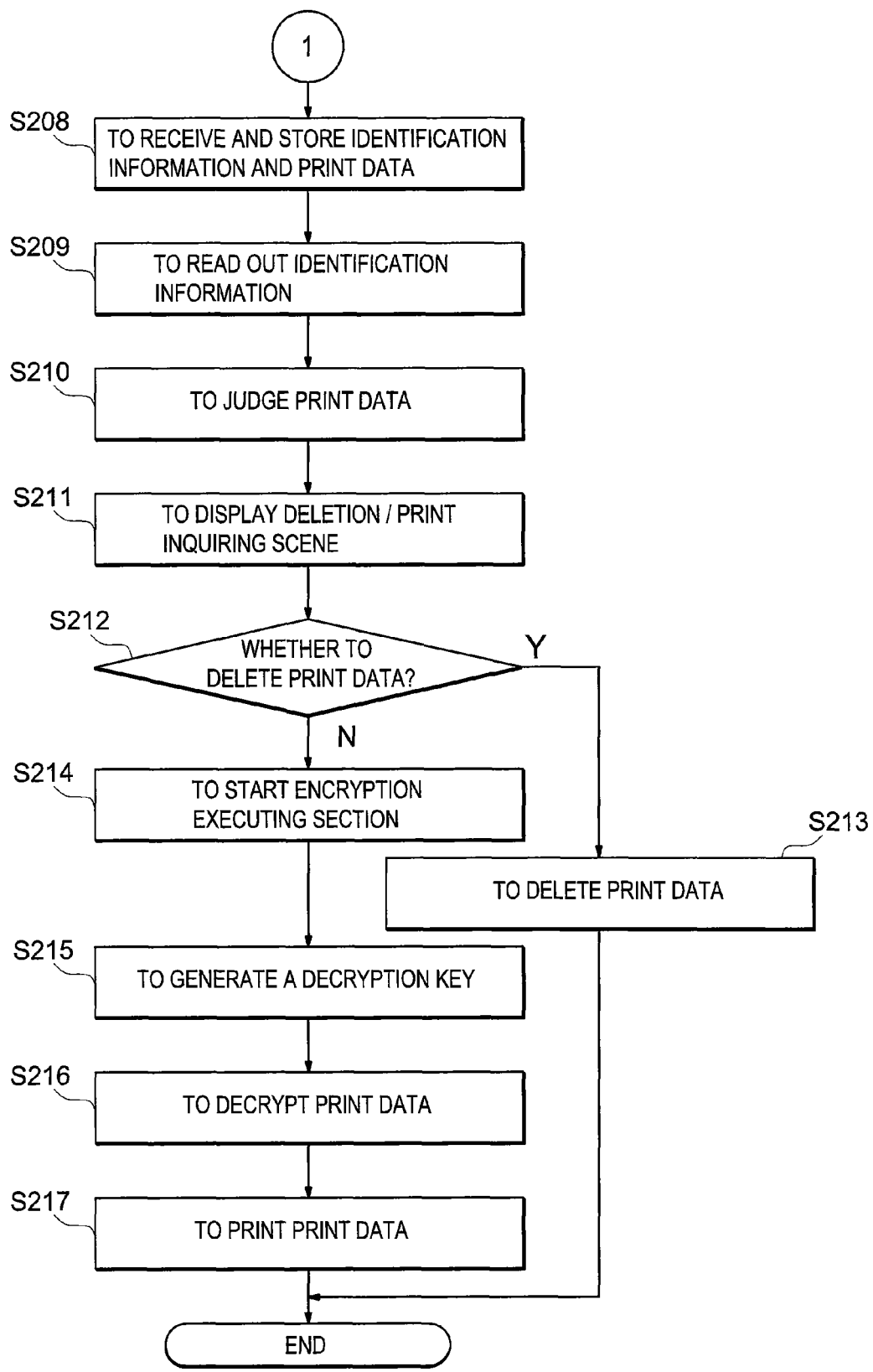
FIG. 6 is a second flowchart showing operations of a printing system of the present invention in embodiment 2.

FIG. 6 is a second flowchart showing operations of a printing system of the present invention in embodiment 1, that is, the FIG. 6 shows operation of the printing apparatus 41.

In the user terminal 11, the terminal side controlling section 22 performs control operation to control the whole user terminal 11, then controls the inputting and displaying section 15 to display a print inquiring scene for inquiring whether to perform a print or not (Step S201). The inputting and displaying section 15 displays the scene so as to make user input (Step S201).

After user selected a print command, the terminal side controlling section 22 reads out print data from the print data storing section 16 and makes the temporary storing section 21 temporarily store the print data (Step S202).

For example, data of [PRINT "Hello world"] is read out and is stored in the temporary storing section 21 as print data.

Further, the terminal side controlling section 22 controls the inputting and displaying section 15 to display an identification card insertion guidance scene so as to make user insert the identification card 14 into the insertion opening of the terminal side reading section 17 (Step S203).

The terminal side reading section 17, when detected that the identification card 14 is located in a readable predetermined place through sensor (not shown), reads out the identification information from the identification information storing section of the identification card 14 (Step S204). The identification information is stored in the temporary storing section 21 through the terminal side controlling section 22 to correspond to the print data (Step S204).

For example, as the identification information of the identification card 14, data of [ID "12 hex"] (hex means that it is hexadecimal) is read out.

Continuously, the encryption key generating portion 23 in the encryption executing section 19 generates an encryption key for encrypting print data on the basis of the identification information (Step S205), the encrypting portion 24 encrypts the print data stored in the temporary storing section 21 on the basis of the generated encryption key (Step S206).

For example, the encryption key generating portion 23 reads out a key generation threshold value (3 hex) which is related to the identification information of [ID "12 hex"] read out from the identification card 14 and the printing apparatus use IP address of (192.168.0.2) of the apparatus side communicating section 25 in the printing apparatus 41 to instruct print; and adds the key generation threshold value (3 hex) into the identification information (12 hex); then obtains an encryption key (15 hex).

Further, the encrypting portion 24 performs an ASCII code change with respect to the print data to change the character string of [PRINT "Hello world"] into ["50, 52, 49, 4E, 54, 22, 48, 65, 6C, 6C, 6F, 77, 20, 77, 6F, 72, 6C, 64, 22" hex].

Moreover, a check sum of MD5 (Message Digest Algorithm 5) or the like is obtained from print data.

Continuously, in order to confirm whether encryption data is normally decrypted or not with respect to print data of ["65, 67, 5E, 63, 69, 37, 5D, 7A, 81, 81, 84, 8C 35, 8C, 84, 87, 81, 79, 37" hex] having added the encryption key (15 hex) per byte of print data performed ASCII code change, the encrypted print data assigned the check sum obtained from the print data is transmitted.

Then, the terminal side communicating section 20 transmits the encrypted print data and the identification information to the printing apparatus 41 (Step S207).

For example, the printing apparatus use IP address of (192.168.0.2), the terminal use IP address of (192.168.0.1) and the identification information (12 hex) are assigned to the encrypted print data and are transmitted together with the encrypted print data.

Next, in the printing apparatus 41, the apparatus side controlling section 44 controls the apparatus side communicating section 25 to receive the identification information and the encrypted print data from the user terminal 11; and controls the temporary storing section 30 to store the identification information and the encrypted print data (Step S208).

For example, when the apparatus side communicating section 25 received the encrypted print data assigned the printing apparatus use IP address of (192.168.0.2) of the apparatus side communicating section 25, the apparatus side controlling section 44 makes a relation among the encrypted print data, the terminal use IP address of (192.168.0.1) assigned to the encrypted print data and the identification information (12 hex) and controls the temporary storing section 30 to store them.

Then, when user goes to the printing apparatus 41 and uses his/her own identification card 14 to insert the identification card 14 into the insertion opening of the apparatus side reading section 26, the apparatus side reading section 26 reads out the identification information from the identification card 14 after detected that the identification card 14 is located in a readable predetermined place through sensor (not shown) (Step S209).

After the identification information is read out, the judging section 27 searches the temporary storing section 30, and judges identification information which corresponds to the identification information read out from the identification card 14, then judges print data corresponding to the judged identification information (Step S210).

After the print data is judged, the apparatus side inputting and displaying section 42 displays a deletion/print inquiring scene to make user perform manipulation (Step S211).

Figure 7:
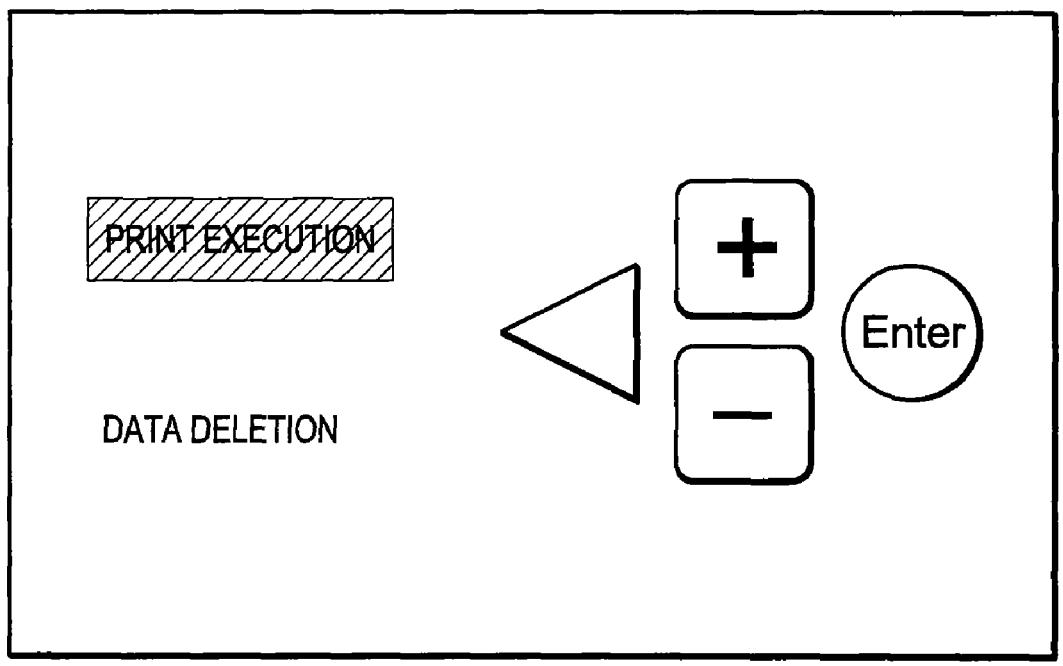
FIG. 7 is an explanation diagram showing deletion/print inquiring scene in embodiment 2 of the present invention.

FIG. 7 is an explanation diagram showing deletion/print inquiring scene in embodiment 2 of the present invention.

On the deletion/print inquiring scene, as shown by the FIG. 7, inquiry content of "print execution/data deletion" is displayed, and "+" button, "−" button and "Enter" button are furnished for making user select.

Through pressing these buttons, corresponding signal is outputted from the apparatus side inputting and displaying section 42.

On the one hand, in the case that user selects the "data deletion" and presses the "Enter" button (Step S212), the deletion controlling section 43 deletes the print data without starting the decryption executing section 28 (Step S213).

Then, the apparatus side controlling section 44 finishes the process.

On the other hand, in the case that user selects the "print execution" and presses the "Enter" button (Step S212), the deletion controlling section 43 starts the decryption executing section 28 (Step S214).

The decryption key generating portion 32 of the started decryption executing section 28 generates a decryption key for decrypting the print data on the basis of the identification information (Step S215), the decrypting portion 33 decrypts the print data on the basis of the generated decryption key (Step S216).

For example, after the encrypted print data assigned the identification information (12 hex) is judged, the decryption key generating portion 32 reads out the key generation threshold value (3 hex) corresponding to the terminal use IP address of (192.168.0.1) related to the encrypted print data.

Then, a decryption key (15 hex) is generated by adding the key generation threshold value (3 hex) to the identification information (12 hex).

The decrypting portion 33 extracts data of ["65, 67, 5E, 63, 69, 37, 5D, 7A, 81, 81, 84, 8C 35, 8C, 84, 87, 81, 79, 37" hex] except a check sum from the encrypted print data, and performs a subtraction to subtract the decryption key (15 hex) from each byte, then obtains data of ["50, 52, 49, 4E, 54, 22, 48, 65, 6C, 6C, 6F, 77, 20, 77, 6F, 72, 6C, 64, 22" hex] having be released encryption.

Moreover, through performing a character code change of ASCII code, print data of [PRINT "Hello world"] is obtained.

Furthermore, a check sum of MD5 or the like is obtained from print data having be released encryption, then the check sum is compared with the check sum assigned to the encrypted print data, if the two check sums are in conformity, it means that the print data is correctly decrypted, then a printing process is executed; if two check sums are different, an error without data conformity is displayed.

After the print data is decrypted, the printing section 29 prints the print data onto record medium such as print paper and ejects the printed paper as record medium finished with printing (Step S217). With the ejection of the record medium finished with printing, user can obtain the record medium finished with printing in the place.

Then, the apparatus side controlling section 44 finishes the process.

Effect of the Embodiment 2:

According to the embodiment 2 of the present invention, not only it is possible to prevent the record medium finished with printing from being taken by other people, but also it is possible to improve the secrecy performance of print data.

Further, because set selection function of deletion/print with respect to print data in printing apparatus, even if the print data is transmitted from the user terminal, unnecessary print can be stopped. Therefore, it is possible to economize toner or the like.

Next, it is to explain embodiment 3.

Regarding the same component as that in the embodiments 1 and 2, the same symbol will be assigned, and the same explanation will be omitted.

Embodiment 3

Figure 8:
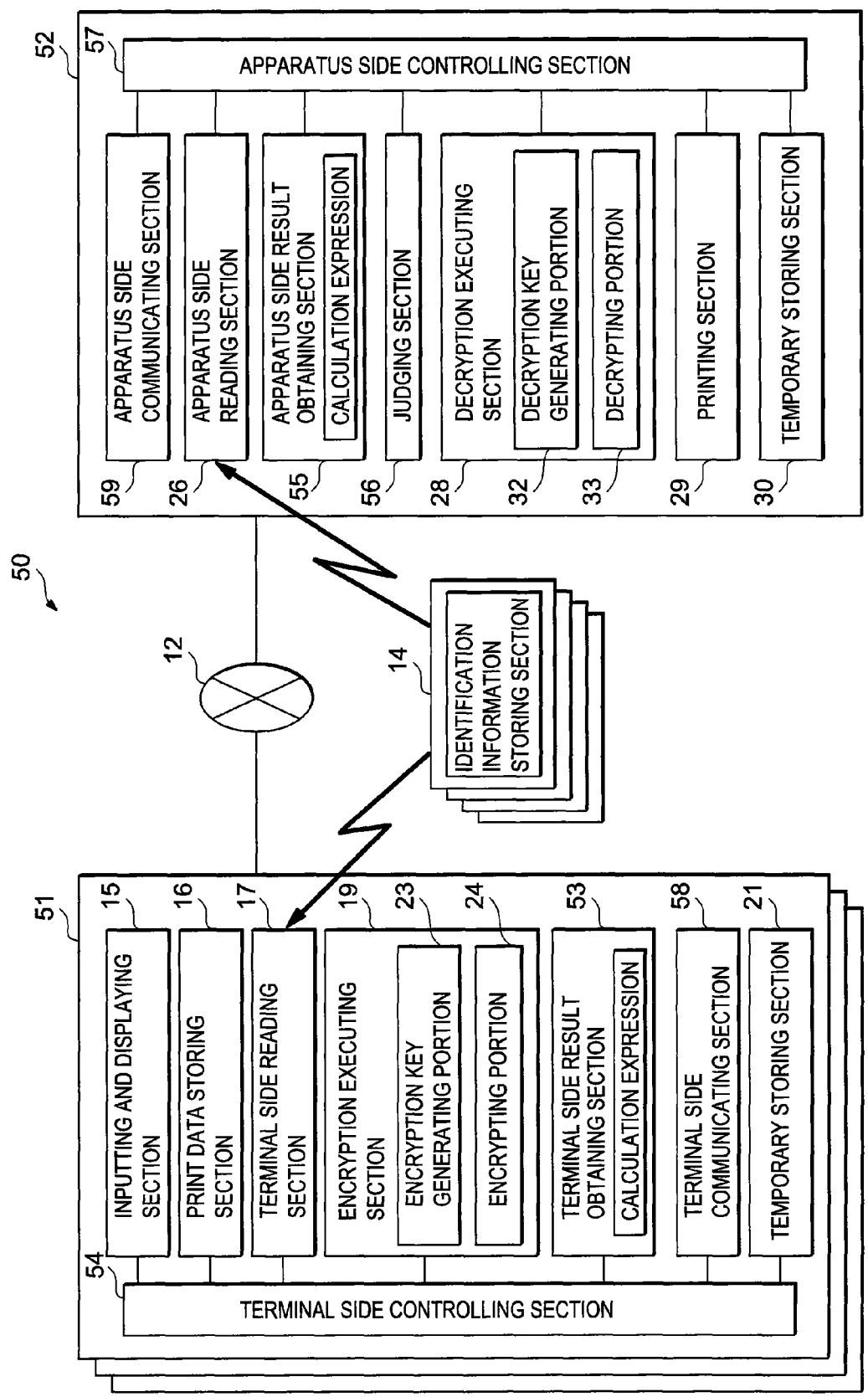
FIG. 8 is a block diagram showing a structure of a printing system of the present invention in embodiment 3.

Structure of Embodiment 3:

FIG. 8 is a block diagram showing a structure of a printing system of the present invention in embodiment 3.

As shown by FIG. 8, a printing system 50 of the present invention comprises a plurality of user terminals 51, a printing apparatus 52 connecting with the plurality of user terminals 51 via communication line 12, and a plurality of identification cards 14 that can be read and communicated by the respective user terminals 51 and the printing apparatus 52.

The printing system 50 is used as a kind of image forming system; the user terminal 51 is used as a kind of image processing apparatus; and the printing apparatus 52 is used as a kind of image forming apparatus.

Furthermore, the user terminal 51 may be used by plural users, also may be exclusively used by one user.

The user terminal 51 includes an inputting and displaying section 15, a print data storing section 16, a terminal side reading section 17, an encryption executing section 19, a terminal side communicating section 58, a temporary storing section 21, a terminal side result obtaining section 53 and a terminal side controlling section 54 for controlling the respective sections.

The terminal side result obtaining section 53 has a function to previously store a predetermined calculation expression; and use the predetermined calculation expression to perform a predetermined calculation with respect to the identification information read out; then obtain a calculation result.

The terminal side communicating section 58 has a function to perform transmission and receiving with the printing apparatus 52 via the communication line 12 such as LAN (Local Area Network) or the like. Therefore, the terminal side communicating section 58, as a transmitting section, has a function to transmit the encrypted print data to the printing apparatus 52 together with the obtained calculation result. In the terminal side communicating section 58, for example, a number of (192.168.0.1) is allotted as a terminal use IP address (Internet Protocol Address) for identifying terminal.

The terminal side controlling section 54 performs whole control operation for making the above stated respective functions in the user terminal 51 realize, so has a control program (not shown). Further, the printing apparatus 52 includes an apparatus side communicating section 59, an apparatus side reading section 26, a judging section 56, a decryption executing section 28, a printing section 29, a temporary storing section 30, an apparatus side result obtaining section 55 and an apparatus side controlling section 57 to control these sections.

The apparatus side communicating section 59 has a function to a function to perform transmission and receiving with the user terminal 51 via the communication line 12. Therefore, the apparatus side communicating section 59, as a receiving section, has a function to receive the calculation result and the print data from the user terminal 51. In the apparatus side communicating section 59, for example, a number of (192.168.0.2) is allotted as a printing apparatus use IP address (Internet Protocol Address) for identifying printing apparatus.

The apparatus side result obtaining section 55 has a function to previously store a predetermined calculation expression which is the same as that in the terminal side result obtaining section 53 mentioned above; and use the predetermined calculation expression to perform a predetermined calculation with respect to the identification information read out by the apparatus side reading section 26; then obtain a calculation result.

The judging section 56 has a function to judge the received print data on the basis of the obtained calculation result obtained by the apparatus side result obtaining section 55.

The apparatus side controlling section 57 performs whole control operation for making the above stated respective functions in the printing apparatus 52 realize, so has a control program (not shown).

Operations of Embodiment 3:

First is to explain a decision of a key generation threshold value between the user terminal 51 and the printing apparatus 52.

On the side of the user terminal 51, when a power source is turned on; or when a print request happens; or when a modification request of a key generation threshold value used by the user terminal 51 and the printing apparatus 52 happens at each predetermined time or through a manipulation of user, the terminal side controlling section 54 produces random number, and stores a key generation threshold value (e.g. 3 hex) decided by the produced random number, and the printing apparatus use IP address of (192.168.0.2) into a key generation threshold value storing section in the user terminal 51 through making a relation of the key generation threshold value and the printing apparatus use IP address.

Then, the terminal side communicating section 58 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

The apparatus side controlling section 57 in the printing apparatus 52, when received the key modification instructing command assigned the printing apparatus use IP address of (192.168.0.2), stores the key generation threshold value (3 hex) and the terminal use IP address of (192.168.0.1) assigned to the key generation threshold value into a key generation threshold value storing section in the printing apparatus 52 through making a relation of the key generation threshold value and the terminal use IP address. Then, in the case that data waiting for an identification print is existing, till the data waiting for an identification print does not exist, an old key generation threshold value is kept. When the data waiting for an identification print becomes inexistent, the old key generation threshold value is deleted.

The apparatus side controlling section 57, after stored the key generation threshold value into the key generation threshold value storing section in the printing apparatus 52, transmits key generation threshold value store end information that is assigned the terminal use IP address of (192.168.0.1) and the printing apparatus use IP address of (192.168.0.2) from the apparatus side communicating section 59 via the communication line 12.

After the terminal side communicating section 58 received the key generation threshold value store end information assigned the terminal use IP address of (192.168.0.1) of the terminal side communicating section 58, the terminal side controlling section 54 performs a display representing an end of modification request of key generation threshold value, and finishes the process.

Further, in the case that the terminal side communicating section 58 does not receive the key generation threshold value store end information assigned the printing apparatus use IP address of the apparatus side communicating section 59 and the terminal use IP address of the terminal side communicating section 58 within a predetermined time, the terminal side controlling section 54 deletes the key generation threshold value (3 hex) related to the printing apparatus use IP address of the apparatus side communicating section 59 from the key generation threshold value storing section in the user terminal 51 due to use incapableness, and makes the inputting and displaying section 15 display an alarm.

Further, on the side of the printing apparatus 52, when a power source is turned on; or when a modification request of a key generation threshold value used by the user terminal 51 and the printing apparatus 52 happens at each predetermined time or through a manipulation of user, the apparatus side controlling section 57 in the printing apparatus 52 produces random number and stores a key generation threshold value (e.g. 3 hex) decided by the produced random number, and the terminal use IP address of (192.168.0.1) into a key generation threshold value storing section in the printing apparatus 52 through making a relation of the key generation threshold value and the terminal use IP address.

Further, in the case that data waiting for an identification print is existing, till the data waiting for an identification print does not exist, the apparatus side controlling section 57 keeps an old key generation threshold value. When the data waiting for an identification print becomes inexistent, the apparatus side controlling section 57 deletes the old key generation threshold value.

Then, the apparatus side communicating section 59 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

When the terminal side communicating section 58 received the key modification instructing command assigned the terminal use IP address of (192.168.0.1) of the terminal side communicating section 58, the terminal side controlling section 54 of the user terminal 51 stores the key generation threshold value (3 hex) and the printing apparatus use IP address of (192.168.0.2) assigned to the key generation threshold value into a key generation threshold value storing section in the user terminal 51 through making a relation of the key generation threshold value and the printing apparatus use IP address.

The terminal side controlling section 54, after stored the key generation threshold value into the key generation threshold value storing section in the user terminal 51, transmits key generation threshold value store end information that is assigned the terminal use IP address of (192.168.0.1) and the printing apparatus use IP address of (192.168.0.2) from the terminal side communicating section 58 via the communication line 12.

After the apparatus side communicating section 59 received the key generation threshold value store end information assigned the printing apparatus use IP address (192.168.0.2) of the apparatus side communicating section 59, the apparatus side controlling section 57 outputs a print representing an end of modification request of key generation threshold value, and finishes the process.

Further, in the case that the apparatus side communicating section 59 does not receive the key generation threshold value store end information assigned the printing apparatus use IP address of the apparatus side communicating section 59 and the terminal use IP address of the terminal side communicating section 58 within a predetermined time, the apparatus side controlling section 57 deletes the key generation threshold value (3 hex) related to the printing apparatus use IP address of (192.168.0.2) of the terminal side communicating section 58 from the key generation threshold value storing section in the printing apparatus 52 due to use incapableness, and makes the printing section 29 output an alarm.

Next, it is to explain operation of the printing system 50 of the present invention according to a flowchart.

Figure 9:
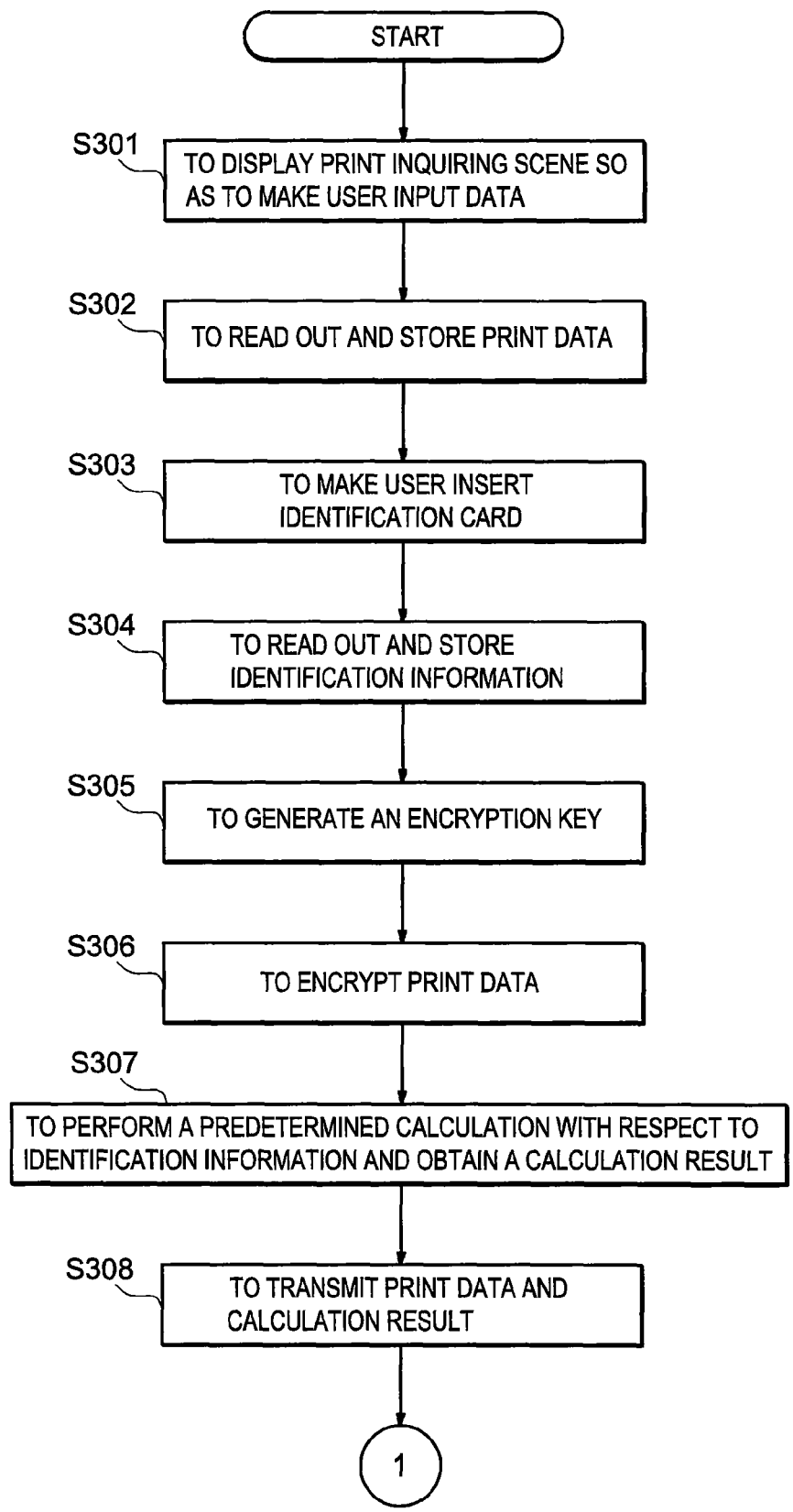
FIG. 9 is a first flowchart showing operations of a printing system of the present invention in embodiment 3.

FIG. 9 is a first flowchart showing operations of a printing system of the present invention in embodiment 3; that is, the FIG. 9 shows operation of the user terminal 51.

Figure 10:
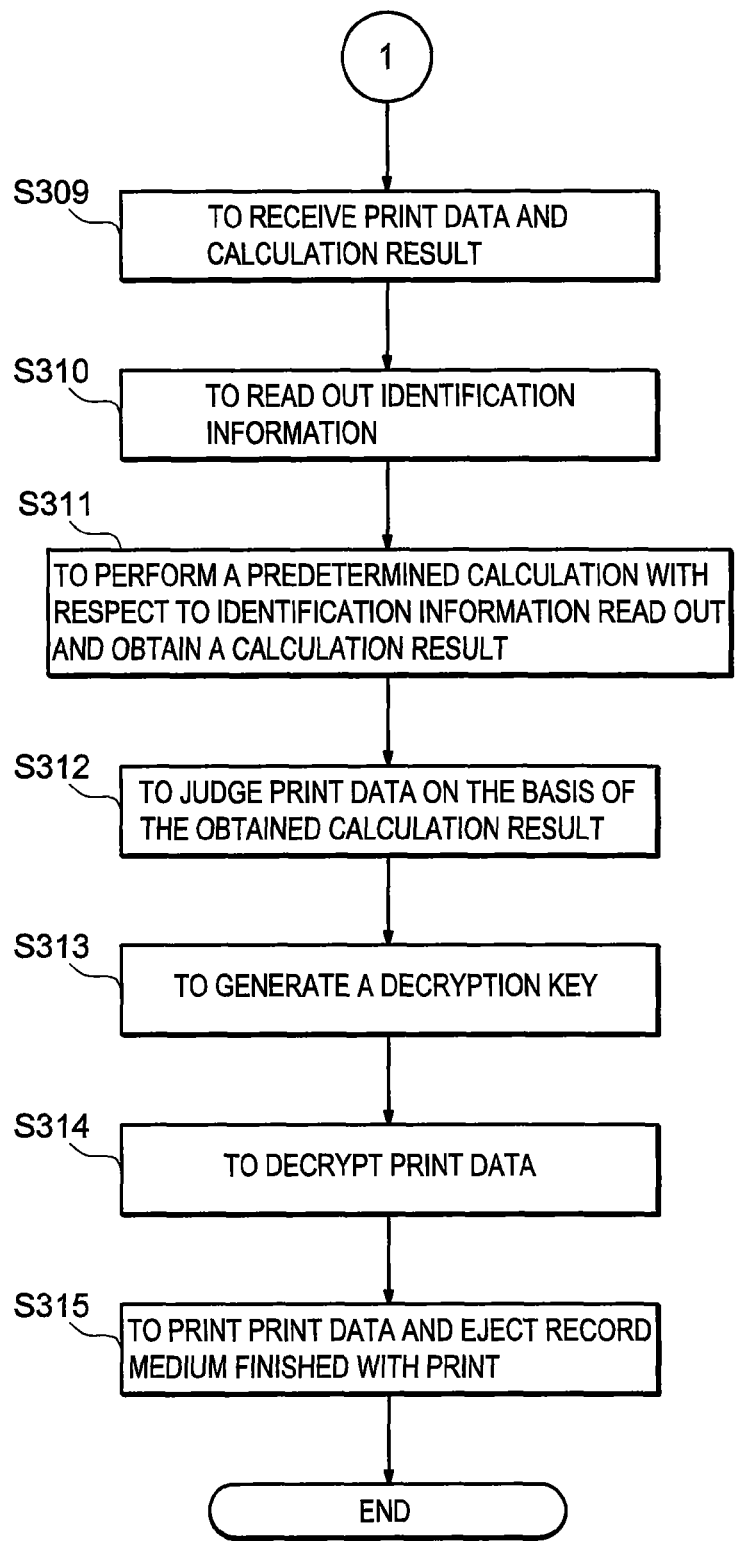
FIG. 10 is a second flowchart showing operations of a printing system of the present invention in embodiment 3.

FIG. 10 is a second flowchart showing operations of a printing system of the present invention in embodiment 3, that is, the FIG. 10 shows operation of the printing apparatus 52.

In the user terminal 51, the terminal side controlling section 54 performs control operation to control the whole user terminal 51, then controls the inputting and displaying section 15 to display a print inquiring scene for inquiring whether to perform a print or not (Step S301). The inputting and displaying section 15 displays the scene so as to make user input (Step S301).

After user selected print command, the terminal side controlling section 54 reads out print data from the print data storing section 16 and makes the temporary storing section 21 temporarily store the print data (Step S302).

For example, data of [PRINT "Hello world"] is read out and is stored in the temporary storing section 21 as print data.

Further, the terminal side controlling section 54 controls the inputting and displaying section 15 to display an identification card insertion guidance scene so as to make user insert the identification card 14 into the insertion opening of the terminal side reading section 17 (Step S303).

The terminal side reading section 17, when detected that the identification card 14 is located in a readable predetermined place through sensor (not shown), reads out the identification information from the identification information storing section of the identification card 14 (Step S304). The identification information is stored in the temporary storing section 21 through the terminal side controlling section 54 to correspond to the print data (Step S304).

For example, as the identification information of the identification card 14, data of [ID "12 hex"] (hex means that it is hexadecimal) is read out.

Continuously, the encryption key generating portion 23 in the encryption executing section 19 generates an encryption key for encrypting print data on the basis of the identification information (Step S305), the encrypting portion 24 encrypts the print data stored in the temporary storing section 21 on the basis of the generated encryption key (Step S306).

For example, the encryption key generating portion 23 reads out a key generation threshold value (3 hex) which is related to the identification information of [ID "12 hex"] read out from the identification card 14 and the printing apparatus use IP address of (192.168.0.2) of the apparatus side communicating section 59 in the printing apparatus 52 to instruct print; and adds the key generation threshold value (3 hex) into the identification information (12 hex); then obtains an encryption key (15 hex).

Further, the encrypting portion 24 performs an ASCII code change with respect to the print data to change the character string of [PRINT "Hello world"] into ["50, 52, 49, 4E, 54, 22, 48, 65, 6C, 6C, 6F, 77, 20, 77, 6F, 72, 6C, 64, 22" hex].

Moreover, a check sum of MD5 (Message Digest Algorithm 5) or the like is obtained from print data.

Continuously, in order to confirm whether encryption data is normally decrypted or not with respect to print data of ["65, 67, 5E, 63, 69, 37, 5D, 7A, 81, 81, 84, 8C 35, 8C, 84, 87, 81, 79, 37" hex] having added the encryption key (15 hex) per byte of print data performed ASCII code change, the encrypted print data assigned the check sum obtained from the print data is transmitted.

Further, the terminal side result obtaining section 53 uses the predetermined calculation expression to perform a predetermined calculation with respect to the identification information; and obtains a calculation result corresponding to the identification information (Step S307).

The calculation result is, for example, a bit string with a predetermined length, and is stored in the temporary storing section 21 (Step S307).

The terminal side result obtaining section 53, for example, obtains an identification information check sum of MD5 or the like from identification information as the print data, continuously adds the encryption key (15 hex) to each byte of identification information, further assigns the identification information check sum, then stores the encrypted identification information to the temporary storing section 21 as calculation result.

Then, the terminal side communicating section 58 transmits the encrypted print data and the identification information to the printing apparatus 52 (Step S308).

For example, the printing apparatus use IP address of (192.168.0.2), the terminal use IP address of (192.168.0.1) and the encryption identification information which is the calculation result are assigned to the encrypted print data and are transmitted together with the encrypted print data.

Next, in the printing apparatus 52, the apparatus side controlling section 57 controls the apparatus side communicating section 59 to receive the calculation result and the encrypted print data from the user terminal 51; and controls the temporary storing section 30 to store the identification information and the encrypted print data (Step S309).

For example, when the apparatus side communicating section 59 received the encrypted print data assigned the printing apparatus use IP address of (192.168.0.2) of the apparatus side communicating section 59, the apparatus side controlling section 57 makes a relation among the encrypted print data, the terminal use IP address of (192.168.0.1) assigned to the encrypted print data and the encryption identification information and controls the temporary storing section 30 to store them.

Then, when user goes to the printing apparatus 52 and uses his/her own identification card 14 to insert the identification card 14 into the insertion opening of the apparatus side reading section 26, the apparatus side reading section 26 reads out the identification information from the identification card 14 after detected that the identification card 14 is located in a readable predetermined place through sensor (not shown) (Step S310).

After the identification information is read out, the apparatus side result obtaining section 55 uses the predetermined calculation expression to perform a predetermined calculation with respect to the identification information read out, and obtains a calculation result corresponding to the identification information (Step S311).

The calculation result is a bit string with predetermined length and is stored in the temporary storing section 30 (Step S311).

For example, as an example of predetermined calculation of the apparatus side result obtaining section 55, it is possible to obtain an identification information check sum of MD5 or the like from identification information.

Then, a key generation threshold value (3 hex) corresponding to the terminal use IP address of (192.168.0.1) related to the encrypted print data is read out.

Then, an encryption key (15 hex) is generated through adding the key generation threshold value (3 hex) to the identification information (12 hex).

Further, through adding the encryption key (15 hex) to each byte of the identification information to obtain a data (17 hex), assigning the identification information check sum of MD5 or the like and calculating encryption identification information, a result is obtained, the result is stored in the temporary storing section 30 as a calculation result.

Continuously, the judging section 56 searches the temporary storing section 30, and judges encryption identification information which corresponds to the obtained calculation result, then judges encrypted print data corresponding to the judged encryption identification information (Step S312).

Further, as another example of the judging section 56, a key generation threshold value (3 hex) corresponding to the terminal use IP address of (192.168.0.1) related to the encrypted print data is read out.

Then, a decryption key (15 hex) is generated through adding the key generation threshold value (3 hex) to the identification information (12 hex).

Further, through subtracting an encryption key (15 hex) from a part except a check sum of identification information of encryption identification information related to the encrypted print data and releasing encryption, it is possible to judge whether a MD5 check sum of a released result is the same as a check sum assigned to the encryption identification information, in addition, to judge print data corresponding to the case that identification information obtained by decrypting the encrypted identification information is the same as the identification information read out from the identification card.

After the print data is judged, the decryption key generating portion 32 of the decryption executing section 28 generates a decryption key for decrypting the print data on the basis of the identification information (Step S313), the decrypting portion 33 decrypts the print data on the basis of the generated decryption key (Step S314).

For example, after the encrypted print data assigned the identification information (12 hex) is judged, the decryption key generating portion 32 reads out the key generation threshold value (3 hex) corresponding to the terminal use IP address of (192.168.0.1) related to the encrypted print data.

Then, a decryption key (15 hex) is generated by adding the key generation threshold value (3 hex) to the identification information (12 hex).

The decrypting portion 33 extracts data of ["65, 67, 5E, 63, 69, 37, 5D, 7A, 81, 81, 84, 8C 35, 8C, 84, 87, 81, 79, 37" hex] except a check sum from the encrypted print data, and performs a subtraction to subtract the decryption key (15 hex) from each byte, then obtains data of ["50, 52, 49, 4E, 54, 22, 48, 65, 6C, 6C, 6F, 77, 20, 77, 6F, 72, 6C, 64, 22" hex] having be released encryption.

Moreover, through performing a character code change of ASCII code, print data of [PRINT "Hello world"] is obtained.

Furthermore, a check sum of MD5 or the like is obtained from print data having be released encryption, then the check sum is compared with the check sum assigned to the encrypted print data, if the two check sums are in conformity, it means that the print data is correctly decrypted, then a printing process is executed; if two check sums are different, an error without data conformity is displayed.

After the print data is decrypted, the printing section 29 prints the print data onto record medium such as print paper and ejects the printed paper as record medium finished with printing (Step S315).

Then, the apparatus side controlling section 57 finishes the process.

Effect of the Embodiment 3:

According to the embodiment 3 of the present invention, not only it is possible to prevent the record medium finished with printing from being taken by other people; but also it is possible to improve the secrecy performance of print data.

Further, the identification information is not directly transmitted from the user terminal to the printing apparatus, instead of the identification information, a calculation result is transmitted after performed a predetermined calculation with respect to the identification information. Therefore, it is possible to more improve the secrecy performance of print data.

Next, it is to explain embodiment 4.

Regarding the same component as that in the embodiments 1, 2 and 3, the same symbol will be assigned, and the same explanation will be omitted.

Embodiment 4

Figure 11:
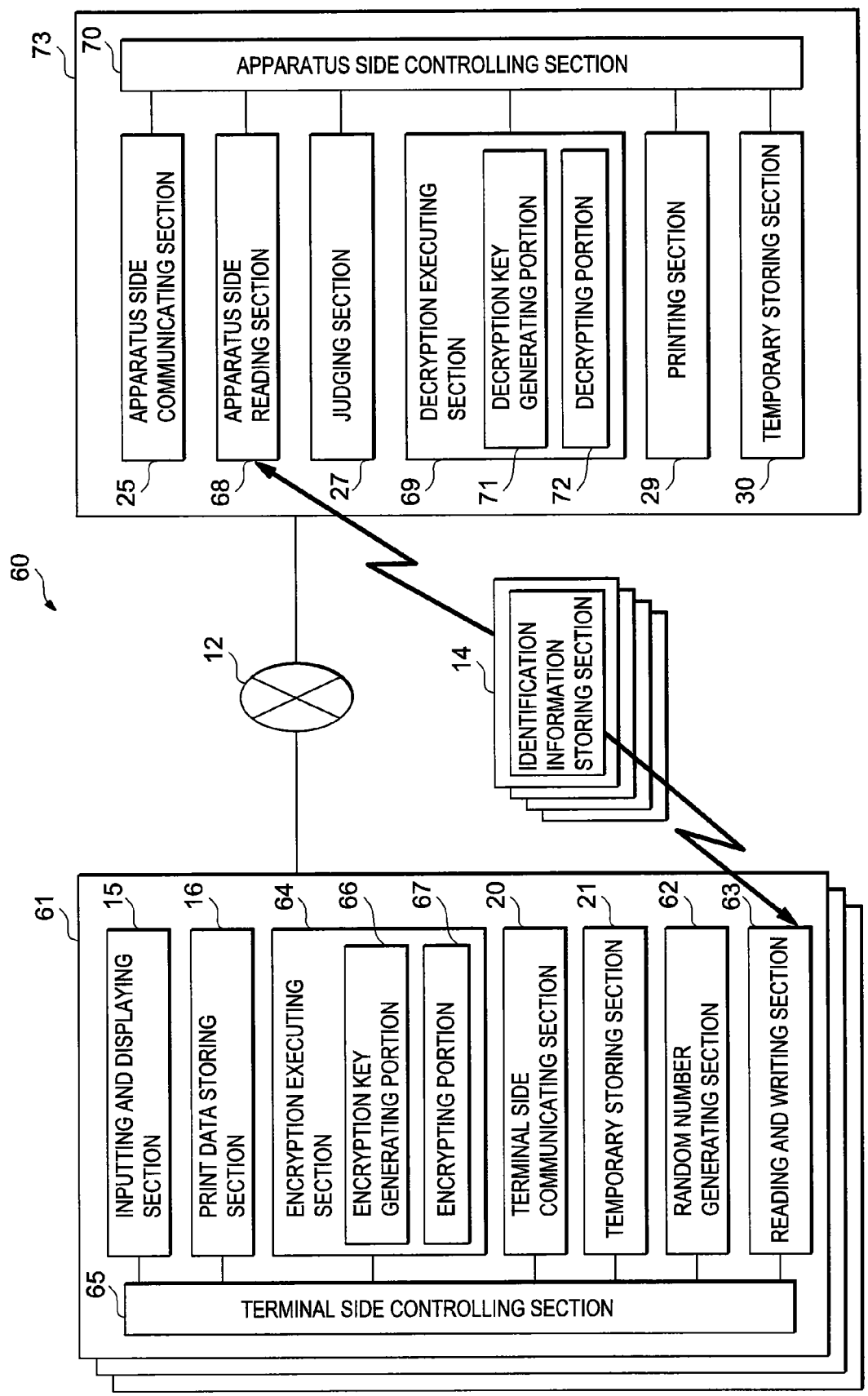
FIG. 11 is a block diagram showing a structure of a printing system of the present invention in embodiment 4.

Structure of Embodiment 4:

FIG. 11 is a block diagram showing a structure of a printing system of the present invention in embodiment 4.

As shown by FIG. 11, a printing system 60 of the present invention comprises a plurality of user terminals 61, a printing apparatus 73 connecting with the plurality of user terminals 61 via communication line 12, and a plurality of identification cards 14 that can be read and communicated by the respective user terminals 61 and the printing apparatus 73.

The printing system 60 is used as a kind of image forming system; the user terminal 61 is used as a kind of image processing apparatus; and the printing apparatus 73 is used as a kind of image forming apparatus.

Furthermore, the user terminal 61 may be used by plural users, also may be exclusively used by one user.

The user terminal 61 includes an inputting and displaying section 15, a print data storing section 16, an encryption executing section 64, a terminal side communicating section 20, a temporary storing section 21, a random number generating section 62, a reading and writing section 63 and a terminal side controlling section 65 for controlling the respective sections.

The random number generating section 62 has a function to generate random number.

The reading and writing section 63 has a function to read out identification information from the identification card 14 and to write the random number generated by the random number generating section 62 into the identification card 14. On the reading and writing section 63, an insertion opening is furnished for inserting the identification card 14.

The encryption executing section 64 has an encryption key generating portion 66 for generating an encryption key on the basis of the identification information read out by the reading and writing section 63 and the random number generated by the random number generating section 62, and an encrypting portion 67 for encrypting print data on the basis of the generated encryption key.

Moreover, the decryption key generating section 66 may generate an encryption key only on the basis of the random number.

The terminal side controlling section 65 performs whole control operation for making the above stated respective functions in the user terminal 61 realize, so has a control program (not shown).

Further, the printing apparatus 73 includes an apparatus side communicating section 25, an apparatus side reading section 68, a judging section 27, a decryption executing section 69, a printing section 29, a temporary storing section 30 and an apparatus side controlling section 70 to control these sections.

The apparatus side reading section 68 has a function to read out identification information and random number from the identification card 14. On the apparatus side reading section 68, an insertion opening is furnished for inserting the identification card 14.

The decryption executing section 69 has a decryption key generating portion 71 to generate decryption key on the basis of the read out identification information and the random number, and a decrypting portion 72 to decrypt print data on the basis of the generated decryption key.

Moreover, in the case that the encryption key generating portion 66 in the user terminal 61 generates an encryption key only on the basis of the random number, the decryption key generating portion 71 generates a decryption key only on the basis of the random number.

The apparatus side controlling section 70 performs whole control operation for making the above stated respective functions in the printing apparatus 73 realize, so has a control program (not shown).

Operations of Embodiment 4:

First is to explain a decision of a key generation threshold value between the user terminal 61 and the printing apparatus 73.

On the side of the user terminal 61, when a power source is turned on; or when a print request happens; or when a modification request of a key generation threshold value used by the user terminal 61 and the printing apparatus 73 happens at each predetermined time or through a manipulation of user, the terminal side controlling section 65 produces random number, and stores a key generation threshold value (e.g. 3 hex) decided by the produced random number, and the printing apparatus use IP address of (192.168.0.2) into a key generation threshold value storing section in the user terminal 61 through making a relation of the key generation threshold value and the printing apparatus use IP address.

Then, the terminal side communicating section 20 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

The apparatus side controlling section 70 in the printing apparatus 73, when received the key modification instructing command assigned the printing apparatus use IP address of (192.168.0.2), stores the key generation threshold value (3 hex) and the terminal use IP address of (192.168.0.1) assigned to the key generation threshold value into a key generation threshold value storing section in the printing apparatus 73 through making a relation of the key generation threshold value and the terminal use IP address. Then, in the case that data waiting for an identification print is existing, till the data waiting for an identification print does not exist, an old key generation threshold value is kept. When the data waiting for an identification print becomes inexistent, the old key generation threshold value is deleted.

The apparatus side controlling section 70, after stored the key generation threshold value into the key generation threshold value storing section in the printing apparatus 73, transmits key generation threshold value store end information that is assigned the terminal use IP address of (192.168.0.1) and the printing apparatus use IP address of (192.168.0.2) from the apparatus side communicating section 25 via the communication line 12.

After the terminal side communicating section 20 received the key generation threshold value store end information assigned the terminal use IP address of (192.168.0.1) of the terminal side communicating section 20, the terminal side controlling section 65 performs a display representing an end of modification request of key generation threshold value, and finishes the process.

Further, in the case that the terminal side communicating section 20 does not receive the key generation threshold value store end information assigned the printing apparatus use IP address of the apparatus side communicating section 25 and the terminal use IP address of the terminal side communicating section 20 within a predetermined time, the terminal side controlling section 65 deletes the key generation threshold value (3 hex) related to the printing apparatus use IP address of the apparatus side communicating section 25 from the key generation threshold value storing section in the user terminal 61 due to use incapableness, and makes the inputting and displaying section 15 display an alarm.

Further, on the side of the printing apparatus 73, when a power source is turned on; or when a modification request of a key generation threshold value used by the user terminal 61 and the printing apparatus 73 happens at each predetermined time or through a manipulation of user, the apparatus side controlling section 70 in the printing apparatus 73 produces random number and stores a key generation threshold value (e.g. 3 hex) decided by the produced random number, and the terminal use IP address of (192.168.0.1) into a key generation threshold value storing section in the printing apparatus 73 through making a relation of the key generation threshold value and the terminal use IP address.

Further, in the case that data waiting for an identification print is existing, till the data waiting for an identification print does not exist, the apparatus side controlling section 70 keeps an old key generation threshold value. When the data waiting for an identification print becomes inexistent, the apparatus side controlling section 70 deletes the old key generation threshold value.

Then, the apparatus side communicating section 25 transmits the key generation threshold value (3 hex) (hex means that it is hexadecimal) and a key modification instructing command that are assigned the printing apparatus use IP address of (192.168.0.2) and the terminal use IP address of (192.168.0.1) via the communication line 12.

When the terminal side communicating section 20 received the key modification instructing command assigned the terminal use IP address of (192.168.0.1) of the terminal side communicating section 20, the terminal side controlling section 65 of the user terminal 61 stores the key generation threshold value (3 hex) and the printing apparatus use IP address of (192.168.0.2) assigned to the key generation threshold value into a key generation threshold value storing section in the user terminal 61 through making a relation of the key generation threshold value and the printing apparatus use IP address.

The terminal side controlling section 65, after stored the key generation threshold value into the key generation threshold value storing section in the user terminal 61, transmits key generation threshold value store end information that is assigned the terminal use IP address of (192.168.0.1) and the printing apparatus use IP address of (192.168.0.2) from the terminal side communicating section 20 via the communication line 12.

After the apparatus side communicating section 25 received the key generation threshold value store end information assigned the printing apparatus use IP address (192.168.0.2) of the apparatus side communicating section 25, the apparatus side controlling section 70 outputs a print representing an end of modification request of key generation threshold value, and finishes the process.

Further, in the case that the apparatus side communicating section 25 does not receive the key generation threshold value store end information assigned the printing apparatus use IP address of the apparatus side communicating section 25 and the terminal use IP address of the terminal side communicating section 20 within a predetermined time, the apparatus side controlling section 70 deletes the key generation threshold value (3 hex) related to the printing apparatus use IP address of (192.168.0.2) of the terminal side communicating section 20 from the key generation threshold value storing section in the printing apparatus 73 due to use incapableness, and makes the printing section 29 output an alarm.

Next, it is to explain operation of the printing system 60 of the present invention according to a flowchart.

Figure 12:
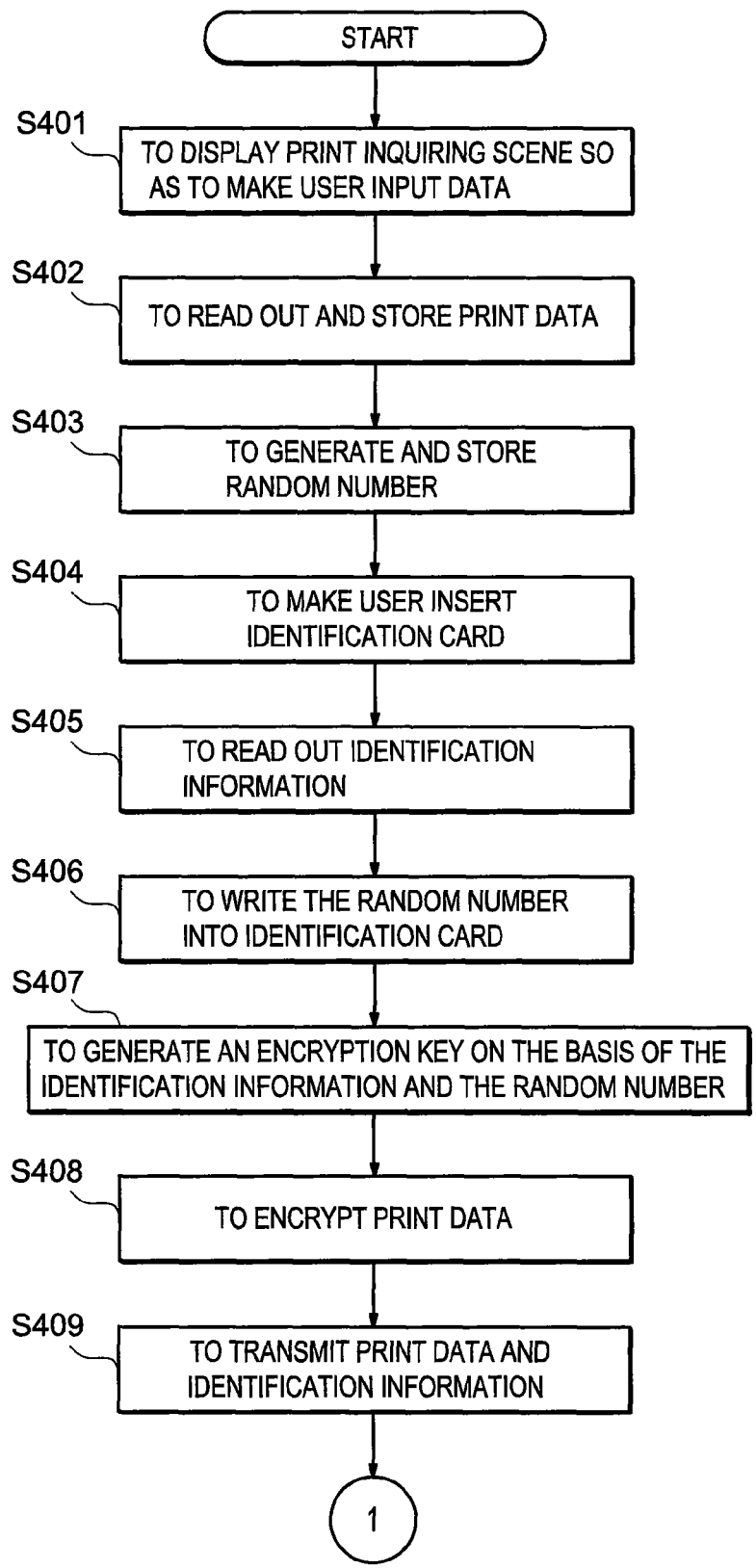
FIG. 12 is a first flowchart showing operations of a printing system of the present invention in embodiment 4.

FIG. 12 is a first flowchart showing operations of a printing system of the present invention in embodiment 4; that is, the FIG. 12 shows operation of the user terminal 61.

Figure 13:
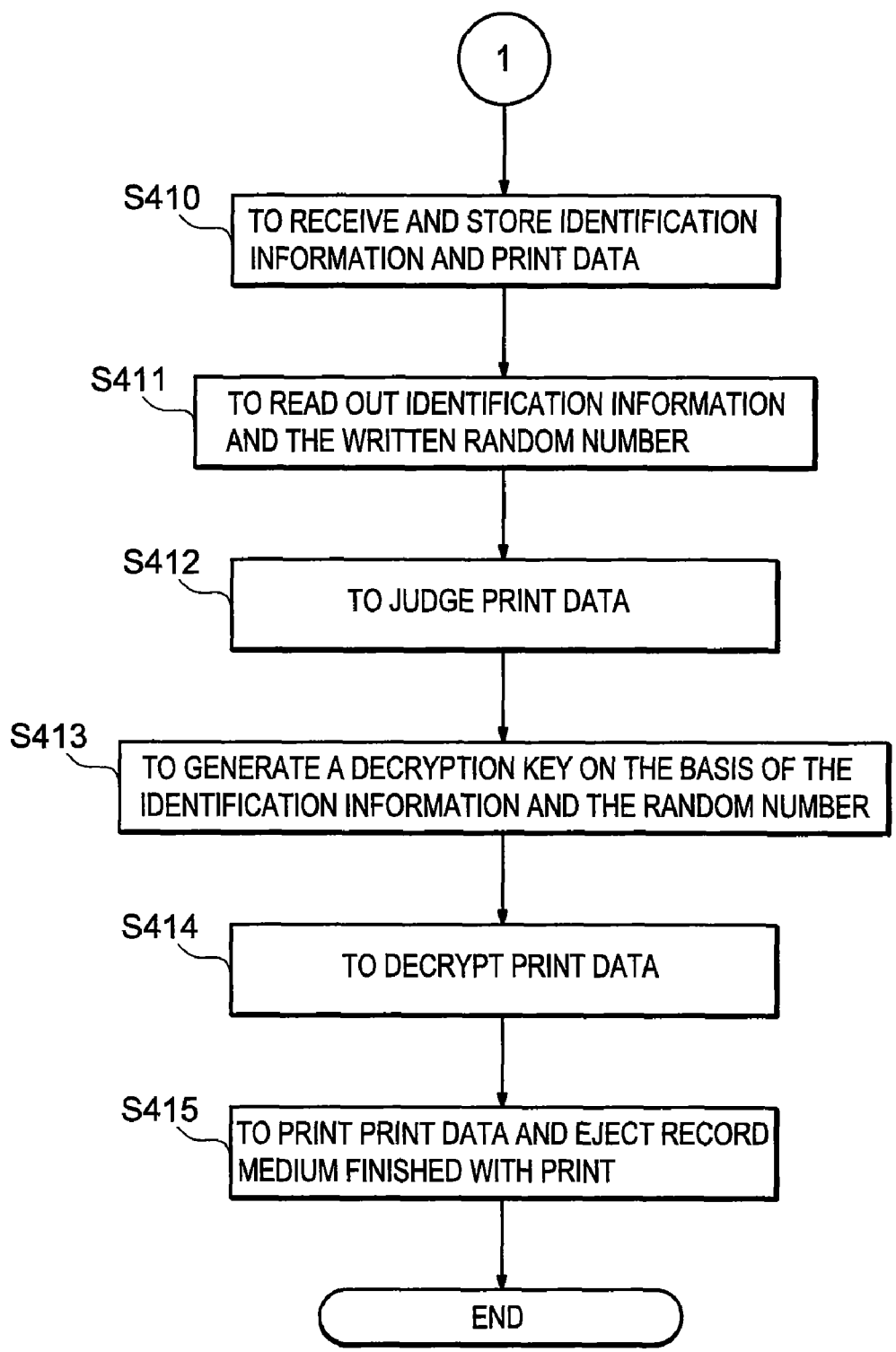
FIG. 13 is a second flowchart showing operations of a printing system of the present invention in embodiment 4.

FIG. 13 is a second flowchart showing operations of a printing system of the present invention in embodiment 4, that is, the FIG. 13 shows operation of the printing apparatus 73.

In the user terminal 61, the terminal side controlling section 65 performs control operation to control the whole user terminal 61, then controls the inputting and displaying section 15 to display a print inquiring scene for inquiring whether to perform a print or not (Step S401). The inputting and displaying section 15 displays the scene so as to make user input (Step S401).

After user selected print command, the terminal side controlling section 65 reads out print data from the print data storing section 16 and makes the temporary storing section 21 temporarily store the print data (Step S402).

For example, data of [PRINT "Hello world"] is read out and is stored in the temporary storing section 21 as print data.

Further, the terminal side controlling section 65 controls the random number generating section 62 to generate random number, and controls the temporary storing section 21 to store the random number (Step S403).

Furthermore, the terminal side controlling section 65 controls the inputting and displaying section 15 to display an identification card insertion guidance scene so as to make user insert the identification card 14 into the insertion opening of the reading and writing section 63 (Step S404).

The reading and writing section 63, when detected that the identification card 14 is located in a readable predetermined place through sensor (not shown), reads out the identification information from the identification information storing section of the identification card 14 (Step S405). The identification information is stored in the temporary storing section 21 through the terminal side controlling section 65 to correspond to the print data (Step S405).

For example, as the identification information of the identification card 14, data of [ID "12 hex"] (hex means that it is hexadecimal) is read out.

Further, the reading and writing section 63 writes the generated random number into the identification card 14 (Step S406).

Continuously, the encryption key generating portion 66 in the encryption executing section 64 generates an encryption key for encrypting print data on the basis of the identification information and the random number (Step S407), the encrypting portion 67 encrypts the print data stored in the temporary storing section 21 on the basis of the generated encryption key (Step S408).

For example, the encryption key generating portion 66 reads out a key generation threshold value (3 hex) which is related to the identification information of [ID "12 hex"] read out from the identification card 14 and the printing apparatus use IP address of (192.168.0.2) of the apparatus side communicating section 25 in the printing apparatus 73 to instruct print; and adds the key generation threshold value (3 hex) into the identification information (12 hex); then obtains an encryption key (15 hex).

Further, the encrypting portion 67 performs an ASCII code change with respect to the print data to change the character string of [PRINT "Hello world"] into ["50, 52, 49, 4E, 54, 22, 48, 65, 6C, 6C, 6F, 77, 20, 77, 6F, 72, 6C, 64, 22" hex].

Moreover, a check sum of MD5 (Message Digest Algorithm 5) or the like is obtained from print data.

Continuously, in order to confirm whether encryption data is normally decrypted or not with respect to print data of ["65, 67, 5E, 63, 69, 37, 5D, 7A, 81, 81, 84, 8C 35, 8C, 84, 87, 81, 79, 37" hex] having added the encryption key (15 hex) per byte of print data performed ASCII code change, the encrypted print data assigned the check sum obtained from the print data is transmitted.

Then, the terminal side communicating section 20 transmits the encrypted print data and the identification information to the printing apparatus 73 (Step S409).

For example, the printing apparatus use IP address of (192.168.0.2), the terminal use IP address of (192.168.0.1) and the identification information (12 hex) are assigned to the encrypted print data and are transmitted together with the encrypted print data.

Next, in the printing apparatus 73, the apparatus side controlling section 70 controls the apparatus side communicating section 25 to receive the identification information and the encrypted print data from the user terminal 61; and controls the temporary storing section 30 to store the identification information and the encrypted print data (Step S410).

For example, when the apparatus side communicating section 25 received the encrypted print data assigned the printing apparatus use IP address of (192.168.0.2) of the apparatus side communicating section 25, the apparatus side controlling section 70 makes a relation among the encrypted print data, the terminal use IP address of (192.168.0.1) assigned to the encrypted print data and the identification information (12 hex) and controls the temporary storing section 30 to store them.

Then, when user goes to the printing apparatus 73 and uses his/her own identification card 14 to insert the identification card 14 into the insertion opening of the apparatus side reading section 68, the apparatus side reading section 68 reads out the identification information stored in and the random number written into from the identification card 14 after detected that the identification card 14 is located in a readable predetermined place through sensor (not shown) (Step S411).

The identification information and the random number read out are stored in the temporary storing section 30 (Step S411).

After the identification information is read out, the judging section 27 searches the temporary storing section 30, and judges identification information which corresponds to the identification information read out from the identification card 14, then judges print data corresponding to the judged identification information (Step S412).

After the print data is judged, the decryption key generating portion 71 of the decryption executing section 69 generates a decryption key for decrypting the print data on the basis of the identification information and the random number read out (Step S413), the decrypting portion 72 decrypts the print data on the basis of the generated decryption key (Step S414).

For example, after the encrypted print data assigned the identification information (12 hex) is judged, the decryption key generating portion 71 reads out the key generation threshold value (3 hex) corresponding to the terminal use IP address of (192.168.0.1) related to the encrypted print data.

Then, a decryption key (15 hex) is generated by adding the key generation threshold value (3 hex) to the identification information (12 hex).

The decrypting portion 72 extracts data of ["65, 67, 5E, 63, 69, 37, 5D, 7A, 81, 81, 84, 8C 35, 8C, 84, 87, 81, 79, 37" hex]

except a check sum from the encrypted print data, and performs a subtraction to subtract the decryption key (15 hex) from each byte, then obtains data of ["50, 52, 49, 4E, 54, 22, 48, 65, 6C, 6C, 6F, 77, 20, 77, 6F, 72, 6C, 64, 22" hex] having be released encryption.

Moreover, through performing a character code change of ASCII code, print data of [PRINT "Hello world"] is obtained.

Furthermore, a check sum of MD5 or the like is obtained from print data having be released encryption, then the check sum is compared with the check sum assigned to the encrypted print data, if the two check sums are in conformity, it means that the print data is correctly decrypted, then a printing process is executed; if two check sums are different, an error without data conformity is displayed.

After the print data is decrypted, the printing section 29 prints the print data onto record medium such as print paper and ejects the printed paper as record medium finished with printing (Step S415). With the ejection of the record medium finished with printing, user can obtain the record medium finished with printing in the place. Then, the apparatus side controlling section 70 finishes the process.

Effect of the Embodiment 4:

According to the embodiment 4 of the present invention, not only it is possible to prevent the record medium finished with printing from being taken by other people; but also it is possible to improve the secrecy performance of print data.

Further, in the user terminal, because a random number is generated, and not only the identification information but also the random number are used to generate the decryption key for decrypting print data, so it is possible to more improve the secrecy performance of print data.

Moreover, in the embodiment 4, there a description that a random number generator (i.e. generating section) to generate random number is provided on the side of the user terminal, but it can be provided on the side of the printing apparatus. In the case, after the user terminal outputs a random number generation request assigned the identification information of the user terminal to the random number generator controlled by the apparatus side controlling section via the terminal side communicating section and the apparatus side communicating section and the apparatus side controlling section monitors time so as to control the random number generator to generate a random number, not only the random number is related to the identification information and is stored in the printing apparatus, but also the random number is transmitted to the user terminal and is stored in the user terminal. Then, in the user terminal, the encryption key generating portion of the encryption executing section may generate an encryption key on the basis of the identification information and the random number; the encrypting portion of the encryption executing section may generate an encrypted print data obtained by encrypting print data on the basis of the generated encryption key; and the terminal side communicating section may transmit the encrypted print data and the identification information.

Furthermoreover, in the printing apparatus, the decryption key generating section of the decryption executing section may generate a decryption key on the basis of the stored random number and the identification information read out; and the decrypting section of the decryption executing section may decrypt the encrypted print data on the basis of the generated decryption key.

Further, in the embodiments 1, 2 and 3, it is possible to transmit the identification information to the printing apparatus after encrypted the identification information through the encrypting portion. Then, the decrypting section of the printing apparatus decrypts the encrypted identification information.

Further, in the embodiments 1, 3 and 4, the printing apparatus may more comprise an apparatus side inputting and displaying section for making user manipulate and an apparatus side judgment controlling section for deleting print data judged by the judging section.

Thus, the apparatus side inputting and displaying section displays a deletion/print inquiring scene used for inquiring user whether to delete print data received from the user terminal 11 or not, so as to make user perform manipulation operation. And the apparatus side judgment controlling section deletes the print data without starting the decryption executing section when a deletion signal representing a deletion is outputted from the apparatus side inputting and displaying section; and starts the decryption executing section when a print signal representing a print is outputted from the apparatus side inputting and displaying section.

Further, in the embodiments 1, 2, 3 and 4, the user terminal may more comprise a terminal side inputting and displaying section for making user select whether to encrypt print data or not; and a terminal side judgment controlling section which performs a warning with respect to user when a non-encryption signal is outputted from the terminal side inputting and displaying section, and makes the encryption executing section perform execution operation when an encryption signal is outputted from the terminal side inputting and displaying section.

Further, in the respective embodiments, it is possible to perform the following operations. That is, on the side of the user terminal, the decryption executing section, when encrypting the print data, also encrypts print data distinguishment information for distinguishing print data in an other method through using the same encryption key as that used in the encryption of print data, then the terminal side communicating section transmits identification information encrypted by the same encryption key and related to the encrypted print data. On the side of the printing apparatus, the apparatus side communicating section receives the encrypted print data and the print data distinguishment information related to the print data; before the decryption executing section decrypts the encrypted print data, the decryption executing section first decrypts the print data distinguishment information; if the print data distinguishment information can be decrypted, the related print data will be decrypted; if the print data distinguishment information can not be decrypted, the related print data will be not decrypted. Thus, it is possible to shorten judgment time to judge whether decryption of the print data can be performed.

Further, in the print data distinguishment information, the identification information to identifying user can be contained.

In the above stated respective embodiments, the user terminal is connected with the printing apparatus. However, instead of the printing apparatus, as image forming apparatus, various devices having image forming function can be adopted such as copying apparatus, facsimile apparatus, multifunction apparatus and the like.

The present invention is not limited to the foregoing embodiments but many modifications and variations are possible within the spirit and scope of the appended claims of the invention.

What is claimed is:

1. An image forming system, comprising:

at least one image processing apparatus;

an image forming apparatus that is connected with the image processing apparatus via a communication line; and at least one carriable medium used for identifying a user using the image processing apparatus, wherein the carriable medium has a record medium finished with printing storing section to store identification information to identify the user using the image processing apparatus;

wherein the image processing apparatus has:
- an image data storing section that stores image data to form an image,
- a processing apparatus side reading section that reads out the identification information from the carriable medium,
- an encryption executing section that executes an encryption with respect to the image data on the basis of the identification information by i) generating an encryption key based on the identification information read from the carriable medium; and ii) encrypting the image data using the generated encryption key, and
- a transmitting section that transmits the encrypted image data to the image forming apparatus together with the identification information; and wherein the image forming apparatus has:
- a receiving section that receives the image data and the identification information from the image processing apparatus,
- a forming apparatus side reading section that reads out the identification information from the carriable medium,
- a judging section that judges the received image data on the basis of the identification information read out,
- a decryption executing section that executes a decryption with respect to the judged image data on the basis of the identification information, and
- an image forming section that performs an image formation of the decrypted image data onto record medium.

2. The image forming system according to claim 1, wherein the identification information is a numerical identification number.

3. The image forming system according to claim 1, wherein the identification information is an identification name of character type, the image processing apparatus further having a data type changing section to change the identification name into that of numerical type.

4. The image forming system according to claim 1, wherein the decryption executing section has a decryption key generating section that generates a decryption key on the basis of the identification information and a decrypting section that decrypts the image data on the basis of the generated decryption key.

5. The image forming system according to claim 4, wherein the identification information to be transmitted by the transmitting section is encrypted by the encrypting portion and is transmitted to the image forming apparatus, the decryption executing section of the image forming apparatus further decrypts the encrypted identification information.

6. An image forming system, comprising:

at least one image processing apparatus;

an image forming apparatus that is connected with the image processing apparatus via a communication line; and at least one carriable medium used for identifying a user using the image processing apparatus, wherein the carriable medium has a record medium finished with printing storing section to store identification information to identify the user using the image processing apparatus;

wherein the image processing apparatus has:
- an image data storing section that stores image data to form an image,
- a processing apparatus side reading section that reads out the identification information from the carriable medium,
- an encryption executing section that executes an encryption with respect to the image data on the basis of the identification information, and
- a transmitting section that transmits the encrypted image data to the image forming apparatus together with the identification information; and wherein the image forming apparatus has:
- a receiving section that receives the image data and the identification information from the image processing apparatus,
- a forming apparatus side reading section that reads out the identification information from the carriable medium,
- a judging section that judges the received image data on the basis of the identification information read out,
- a decryption executing section that executes a decryption with respect to the judged image data on the basis of the identification information, and
- an image forming section that performs an image formation of the decrypted image data onto record medium, wherein the image processing apparatus further has a random number generating section to generate a random number;

the encryption executing section has an encryption key generating portion that generates an encryption key on the basis of the identification information and the random number, and an encrypting portion that encrypts the image data on the generated encryption key;

the transmitting section transmits not only the identification information and the image data, but also the random number;

the decryption executing section has a decryption key generating section that generates a decryption key on the basis of the identification information read out and the random number received, and a decrypting section that decrypts the image data on the basis of the generated decryption key.

7. The image forming system according to claim 6, wherein the identification information to be transmitted by the transmitting section is encrypted by the encrypting portion and is transmitted to the image forming apparatus, the decryption executing section of the image forming apparatus further decrypts the encrypted identification information.

8. An image forming system, comprising:

at least one image processing apparatus;

an image forming apparatus that is connected with the image processing apparatus via a communication line; and at least one carriable medium used for identifying a user using the image processing apparatus, wherein the carriable medium has a record medium finished with printing storing section to store identification information to identify the user using the image processing apparatus;

wherein the image processing apparatus has:
- an image data storing section that stores image data to form an image,
- a processing apparatus side reading section that reads out the identification information from the carriable medium,
- an encryption executing section that executes an encryption with respect to the image data on the basis of the identification information, and
- a transmitting section that transmits the encrypted image data to the image forming apparatus together with the identification information; and wherein the image forming apparatus has:
- a receiving section that receives the image data and the identification information from the image processing apparatus,
- a forming apparatus side reading section that reads out the identification information from the carriable medium,
- a judging section that judges the received image data on the basis of the identification information read out,
- a decryption executing section that executes a decryption with respect to the judged image data on the basis of the identification information, and
- an image forming section that performs an image formation of the decrypted image data onto record medium, wherein the image forming apparatus further has a forming apparatus side inputting and displaying section for making user manipulate and a forming apparatus side judgment controlling section for deleting the image data judged by the judging section, when the identification information is read out by the forming apparatus side reading section, the forming apparatus side inputting and displaying section displays an inquiry scene for inquiring user whether to delete the image data or to perform an image formation with respect to the image data so as to make the user manipulate, in the case that a deletion signal representing a deletion is outputted from the forming apparatus side inputting and displaying section, the forming apparatus side judgment controlling section deletes the image data without starting the decryption executing section to execute a decryption; in the case that an image formation signal representing an image formation is outputted from the forming apparatus side inputting and displaying section, the forming apparatus side judgment controlling section controls the decryption executing section to execute a decryption.

9. An image forming system, comprising:

at least one image processing apparatus;

an image forming apparatus that is connected with the image processing apparatus via a communication line; and at least one carriable medium used for identifying a user using the image processing apparatus, wherein the carriable medium has a record medium finished with printing storing section to store identification information to identify the user using the image processing apparatus;

wherein the image processing apparatus has:
- an image data storing section that stores image data to form an image,
- a processing apparatus side reading section that reads out the identification information from the carriable medium,
- an encryption executing section that executes an encryption with respect to the image data on the basis of the identification information by i) generating an encryption key based on the identification information read from the carriable medium; and ii) encrypting the image data using the generated encryption key, and
- a transmitting section that transmits the encrypted image data to the image forming apparatus together with the identification information; and wherein the image forming apparatus has:
- a receiving section that receives the image data and the identification information from the image processing apparatus,
- a forming apparatus side reading section that reads out the identification information from the carriable medium,
- a judging section that judges the received image data on the basis of the identification information read out,
- a decryption executing section that executes a decryption with respect to the judged image data on the basis of the identification information, and
- an image forming section that performs an image formation of the decrypted image data onto record medium, wherein the image processing apparatus further has a processing apparatus side inputting and displaying section for making user select whether to encrypt the image data, and a processing apparatus side judgment controlling section that performs a warning with respect to the user when a non-encryption signal representing non-encryption is outputted from the processing apparatus side inputting and displaying section, and controls the encryption executing section to execute an encryption when an encryption signal representing encryption is outputted from the processing apparatus side inputting and displaying section.

10. An image forming system, comprising:

at least one image processing apparatus;

an image forming apparatus that is connected with the image processing apparatus via a communication line; and at least one carriable medium used for identifying a user using the image processing apparatus, wherein the carriable medium previously store identification information to identify corresponding user using the image processing apparatus;

wherein the image processing apparatus has:
- an image data storing section that stores image data to form an image,
- a processing apparatus side reading section that reads out the identification information from the carriable medium,
- an encryption executing section that executes an encryption with respect to the image data on the basis of the identification information, a processing apparatus side result obtaining section that performs a predetermined calculation with respect to the identification information and obtains a calculation result corresponding to the identification information, and a transmitting section that assigns the calculation result to the encrypted image data and transmits the encrypted image data and the calculation result to the image forming apparatus; and wherein the image forming apparatus has:

a receiving section that receives the image data and the calculation result from the image processing apparatus, a forming apparatus side reading section that reads out the identification information from the carriable medium, a forming apparatus side result obtaining section that performs the predetermined calculation with respect to the identification information read out and obtains a calculation result corresponding to the identification information, a judging section that judges the received image data on the basis of the obtained calculation result, a decryption executing section that executes a decryption with respect to the judged image data on the basis of the identification information, and an image forming section that performs an image formation of the decrypted image data onto record medium.

11. The image forming system according to claim 10, wherein the processing apparatus side result obtaining section and the forming apparatus side result obtaining section previously store a calculation expression to correspond to the predetermined calculation.

12. The image forming system according to claim 10, wherein the identification information is one of a numerical identification number and identification name of character type, the image processing apparatus further having a data type changing section to change the identification name into that of numerical type.

13. The image forming system according to claim 10, wherein the encryption executing section has an encryption key generating portion that generates an encryption key on the basis of the identification information and an encrypting portion that encrypts the image data on the generated encryption key; and the decryption executing section has a decryption key generating section that generates a decryption key on the basis of the identification information and a decrypting section that decrypts the image data on the basis of the generated decryption key.

14. The image forming system according to claim 10, wherein the image processing apparatus further has a random number generating section to generate a random number;

the encryption executing section has an encryption key generating portion that generates an encryption key on the basis of the identification information and the random number, and an encrypting portion that encrypts the image data on the generated encryption key;

the transmitting section transmits not only the identification information and the image data, but also the random number;

the decryption executing section has a decryption key generating section that generates a decryption key on the basis of the identification information read out and the random number received, and a decrypting section that decrypts the image data on the basis of the generated decryption key.

15. The image forming system according to claim 10, wherein the image forming apparatus further has a forming apparatus side inputting and displaying section for making user manipulate and a forming apparatus side judgment controlling section for deleting the image data judged by the judging section, when the identification information is read out by the forming apparatus side reading section, the forming apparatus side inputting and displaying section displays an inquiry scene for inquiring user whether to delete the image data or to perform an image formation with respect to the image data so as to make the user manipulate, in the case that a deletion signal representing a deletion is outputted from the forming apparatus side inputting and displaying section, the forming apparatus side judgment controlling section deletes the image data without starting the decryption executing section to execute a decryption; in the case that an image formation signal representing an image formation is outputted from the forming apparatus side inputting and displaying section, the forming apparatus side judgment controlling section controls the decryption executing section to execute a decryption.

16. An image forming system, comprising:

at least one image processing apparatus;

an image forming apparatus that is connected with the image processing apparatus via a communication line; and at least one carriable medium used for identifying a user using the image processing apparatus, wherein the carriable medium previously store identification information to identify corresponding user using the image processing apparatus;

wherein the image processing apparatus has:

an image data storing section that stores image data to form an image, a random number generating section that generates random number, a processing apparatus side reading section that reads out the identification information from the carriable medium, a writing section that writes the random number generated by the random number generating section into the carriable medium, an encryption executing section that executes an encryption with respect to the image data at least on the basis of the random number in the identification information and the random number, and a transmitting section that transmits the encrypted image data and the identification information to the image forming apparatus; and wherein the image forming apparatus has:

a receiving section that receives the image data and the identification information from the image processing apparatus, a forming apparatus side reading section that reads out the identification information and the random number from the carriable medium, a judging section that judges the received image data on the basis of the identification information read out, a decryption executing section that executes a decryption with respect to the judged image data at least on the basis of the random number in the identification information and the random number that are read out, and an image forming section that performs an image formation of the decrypted image data onto record medium.

17. The image forming system according to claim 16, wherein the identification information is a numerical identification number.

18. The image forming system according to claim 16, wherein the identification information is an identification name of character type, the image processing apparatus further having a data type changing section to change the identification name into that of numerical type.

19. The image forming system according to claim 16, wherein the encryption executing section has an encryption key generating portion that generates an encryption key on the basis of the identification information and the random number, and an encrypting portion that encrypts the image data on the generated encryption key; and the decryption executing section has a decryption key generating section that generates a decryption key on the basis of the identification information and the random number that are read out, and a decrypting section that decrypts the image data on the basis of the generated decryption key.

20. The image forming system according to claim 16, wherein the image forming apparatus further has a forming apparatus side inputting and displaying section for making user manipulate and a forming apparatus side judgment controlling section for deleting the image data judged by the judging section, when the identification information is read out by the forming apparatus side reading section, the forming apparatus side inputting and displaying section displays an inquiry scene for inquiring user whether to delete the image data or to perform an image formation with respect to the image data so as to make the user manipulate, in the case that a deletion signal representing a deletion is outputted from the forming apparatus side inputting and displaying section, the forming apparatus side judgment controlling section deletes the image data without starting the decryption executing section to execute a decryption; in the case that an image formation signal representing an image formation is outputted from the forming apparatus side inputting and displaying section, the forming apparatus side judgment controlling section controls the decryption executing section to execute a decryption.

21. An image forming apparatus having communication line capable of connecting with at least one image processing apparatus, comprising:

a reading section that reads out identification information from at least one carriable medium;

a receiving section that receives the image data related to the identification information from the image processing apparatus, a judging section that judges the received image data on the basis of the identification information read out, a decryption executing section that executes a decryption with respect to the judged image data on the basis of the identification information, an image forming section that performs an image formation on the basis of the decrypted image data, a controlling section to generate random number when received a random number generation request;

a storing section to store a random number; and a communication section to transmit the random number stored in the storing section to the image processing apparatus, wherein the decryption executing section has a decryption key generating section that generates a decryption key on the basis of the random number stored in the storing section and the identification information read out, and a decrypting section that decrypts the image data on the basis of the generated decryption key.

22. An image forming apparatus, having communication line capable of connecting with at least one image processing apparatus, comprising:

a reading section that reads out identification information from at least one carriable medium;

a receiving section that receives the image data related to the identification information from the image processing apparatus, a judging section that judges the received image data on the basis of the identification information read out, a decryption executing section that executes a decryption with respect to the judged image data on the basis of the identification information, an image forming section that performs an image formation on the basis of the decrypted image data, wherein the controlling section monitors time of the random number generation request so as to generate the random number.

\* \* \* \* \*